(12) United States Patent
Li et al.

(10) Patent No.: US 9,485,442 B1
(45) Date of Patent: Nov. 1, 2016

(54) IMAGE SENSORS FOR ROBUST ON CHIP PHASE DETECTION, AND ASSOCIATED SYSTEM AND METHODS

(71) Applicant: OmniVision Technologies,Inc., Santa Clara, CA (US)

(72) Inventors: Chengjun Li, Shanghai (CN); Guansong Liu, San Jose, CA (US); Jizhang Shan, Cupertino, CA (US); Chin Poh Pang, Pleasanton, CA (US)

(73) Assignee: OmniVision Technololgies, Inc., Santa Clara, CA (US)

( * ) Notice: Subject to any disclaimer, the term of this patent is extended or adjusted under 35 U.S.C. 154(b) by 0 days.

(21) Appl. No.: 14/714,997

(22) Filed: May 18, 2015

(51) Int. Cl.
*H04N 5/369* (2011.01)
*H04N 5/232* (2006.01)
*H04N 9/04* (2006.01)

(52) U.S. Cl.
CPC ........ *H04N 5/3696* (2013.01); *H04N 5/23212* (2013.01); *H04N 9/045* (2013.01)

(58) Field of Classification Search
CPC .................................................. H04N 5/3696
USPC ...................................... 348/222.1, 340, 345
See application file for complete search history.

(56) References Cited

U.S. PATENT DOCUMENTS 7,924,342 B2   4/2011  Kusaka
8,259,215 B2   9/2012  Sugawara
2004/0021057 A1   2/2004  Drowley
2012/0154637 A1*  6/2012  Hara ................... H04N 5/23212
                                                        348/239
2012/0176532 A1   7/2012  Hara
2013/0088621 A1*  4/2013  Hamada ............... H04N 5/3696
                                                        348/281
2013/0140663 A1   6/2013  Fakuda

FOREIGN PATENT DOCUMENTS

WO         2012144539 A1    10/2012

* cited by examiner

*Primary Examiner* — Lin Ye
*Assistant Examiner* — Chriss Yoder, III
(74) *Attorney, Agent, or Firm* — Lathrop & Gage LLP

(57) ABSTRACT

An image sensor for on-chip phase detection includes a pixel array for capturing an image of a scene, wherein the pixel array has a plurality of horizontal phase-detection rows, each including phase-detection pixels for detecting horizontal change in the scene, and a plurality of vertical phase-detection columns, each including phase-detection pixels for detecting vertical change in the scene, and wherein each of the horizontal phase-detection rows intersects each of the vertical phase-detection columns. A phase-detection method includes generating a pair of horizontal line profiles using one of a plurality of phase-detection rows; generating a pair of vertical line profiles using one of a plurality of phase-detection columns intersecting with the one of a plurality of phase-detection rows; and determining phase shift associated with at least one arbitrarily oriented edge in a scene, based upon the pair of horizontal line profiles and the pair of vertical line profiles.

16 Claims, 20 Drawing Sheets

IMAGE SENSORS FOR ROBUST ON CHIP PHASE DETECTION, AND ASSOCIATED SYSTEM AND METHODS

BACKGROUND

The vast majority of electronic cameras have autofocus capability. The autofocus function automatically focuses the camera on objects in the scene viewed by the camera. Autofocus may be fully automatic such that the camera identifies objects in the scene and focuses on the objects. In some cases, the camera may even decide which objects are more important than other objects and subsequently focus on the more important objects. Alternatively, autofocus may utilize user input specifying which portion or portions of the scene are of interest. Based thereupon, the autofocus function identifies objects within the portion or portions of the scene, specified by the user, and focuses the camera on such objects.

To achieve market adoption, the autofocus function must be reliable and fast such that every time a user captures an image, the camera quickly brings the desired portion, or portions, of the scene into focus. Preferably, the autofocus function is sufficiently fast that the user does not notice any delay between pressing the trigger button and image capture. The autofocus is particularly important for cameras having no means for manual focus, such as compact digital cameras and camera phones.

Many electronic cameras use contrast autofocus, wherein the autofocus function adjusts the imaging objective to maximize contrast in at least a portion of the scene, thus bringing the portion of the scene into focus. More recently, phase-detection autofocus has gained popularity because it is faster than contrast autofocus. Phase-detection autofocus directly measures the degree of misfocus by comparing light passing through one portion of the imaging objective, e.g., the left portion, with light passing through another portion of the imaging objective, e.g., the right portion. Some digital single-lens reflex cameras include a dedicated phase-detection sensor in addition to the image sensor that captures images. However, this solution is not feasible for more compact and/or less expensive cameras. Therefore, camera manufacturers are developing image sensors with on-chip phase detection, i.e., image sensors with integrated phase detection capability. A variety of pixel layouts have been proposed for this purpose. Some of these prior art image sensors are shown in FIGS. 11, 13, and 14 of the present disclosure. Despite these efforts, it remains a challenge to produce a high-performing image sensor with robust on-chip phase detection.

SUMMARY

In an embodiment, an image sensor for on-chip phase detection includes a pixel array for capturing an image of a scene. The pixel array includes a plurality of horizontal phase-detection rows and a plurality of vertical phase-detection columns. Each of the horizontal phase-detection rows has a plurality of phase-detection pixels for detecting horizontal change in the scene. Each of the vertical phase-detection columns has a plurality of phase-detection pixels for detecting vertical change in the scene. Each of the plurality of horizontal phase-detection rows intersects each of the plurality of vertical phase-detection columns.

In an embodiment, a phase-detection method uses an image sensor with on-chip phase-detection pixels. The method includes generating a pair of horizontal line profiles for light from left and right directions, respectively, using one of a plurality of horizontal phase-detection rows of the image sensor. The method further includes generating a pair of vertical line profiles for light from up and down directions, respectively, using one of a plurality of vertical phase-detection columns of the image sensor, wherein the one of a plurality of vertical phase-detection columns intersects the one of a plurality of horizontal phase-detection rows. Additionally, the method includes determining phase shift associated with at least one arbitrarily oriented edge in a scene viewed by the image sensor, based upon the pair of horizontal line profiles and the pair of vertical line profiles.

In an embodiment, an imaging system with on-chip phase-detection includes an image sensor with a pixel array for capturing an image of a scene. The pixel array has intersecting (a) horizontal phase-detection rows for measuring at least one pair of horizontal line profiles for light incident from left and right directions, respectively, and (b) vertical phase-detection columns for measuring at least one pair of vertical line profiles for light incident from up and down directions, respectively. The imaging system further includes a phase-processing module for processing the at least one pair of horizontal line profiles and the at least one pair of vertical line profiles to measure phase shift associated with an arbitrarily oriented and arbitrarily located edge in the scene.

DETAILED DESCRIPTION OF THE EMBODIMENTS

Figure 1:
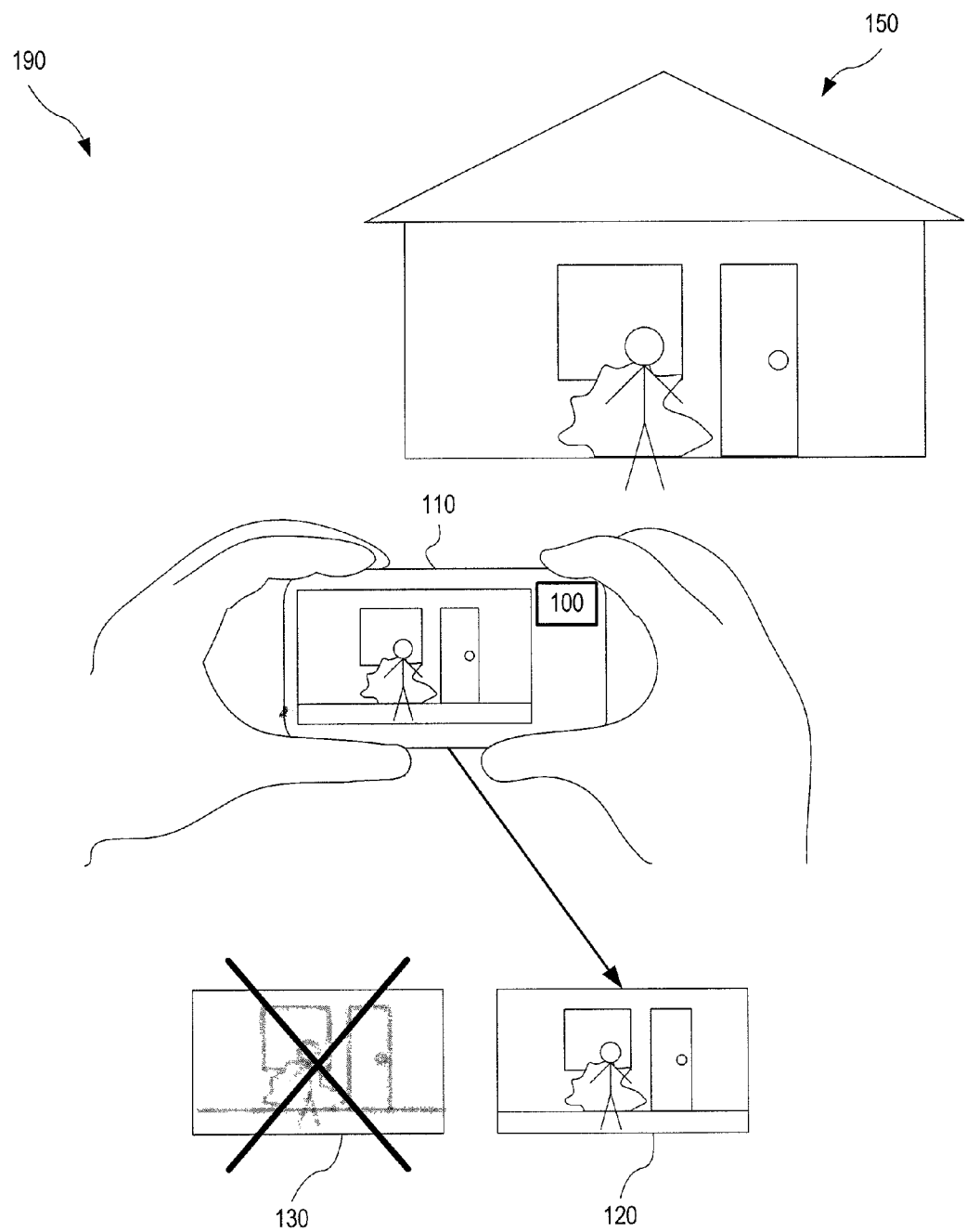
FIG. 1 illustrates an image sensor with robust on-chip phase detection in a use scenario, according to an embodiment.

FIG. 1 illustrates one exemplary image sensor 100, with robust on-chip phase detection, in an exemplary use scenario 190. Image sensor 100 is implemented in an electronic camera 110 for imaging of a scene 150. Electronic camera 110 is, for example, a camera phone or a compact digital camera. Electronic camera 110 utilizes the on-chip phase detection capability of image sensor 100 to focus on scene 150. When focused, electronic camera 110 utilizes image sensor 100 to capture a focused image 120, as opposed to a defocused image 130, of scene 150.

Image sensor 100 is configured to provide robust on-chip phase detection capable of detecting edges, within scene 150, of arbitrary orientation and location. Image sensor 100 thereby enables robust autofocus for electronic camera 110. For example, through use of image sensor 100, electronic camera 110 is able to reliably autofocus on sparsely populated scenes 150. Image sensor 100 also enables a very flexible autofocus function, which may be utilized by electronic camera 110 to autofocus on objects of arbitrary location within scene 150, and/or on an arbitrary selection of portions of scene 150 that are associated with one or more edges. Herein, an "edge" in a scene refers to a spatial difference such as spatial brightness difference or a spatial color difference.

In an embodiment, image sensor 100 is a complementary metal-oxide-semiconductor (CMOS) image sensor. Image sensor 100 may be a color image sensor or a monochrome image sensor.

FIGS. 2A, 2B, 3A, 3B, 4A, and 4B, discussed below, illustrate how on-chip phase detection of image sensor 100 (FIG. 1) may be used to determine the degree of misfocus of one exemplary imaging system composed of image sensor 100 and an imaging objective 210.

Figure 2A:
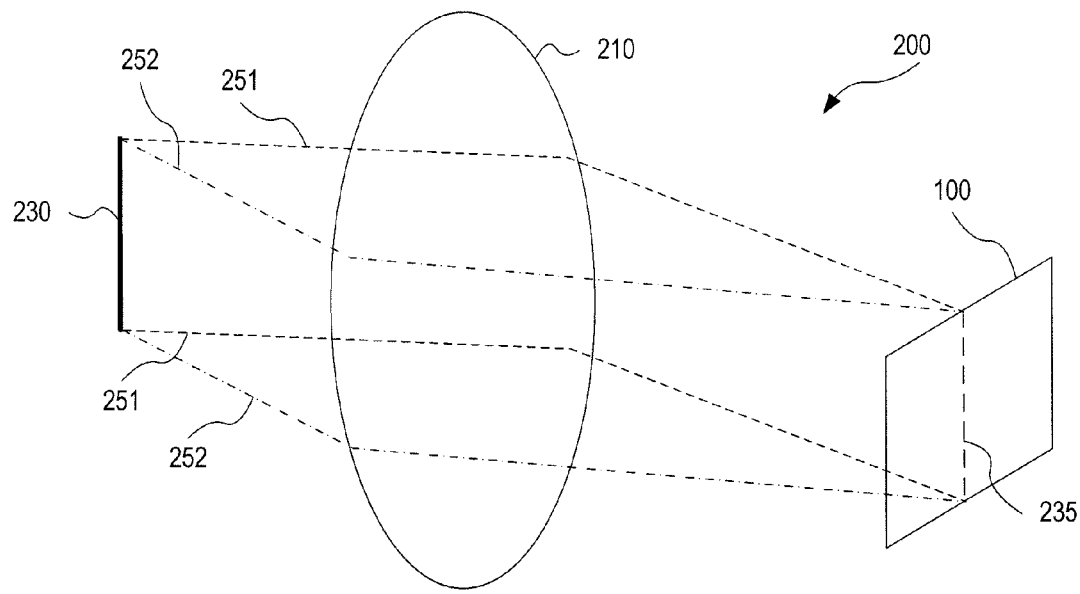
FIGS. 2A and 2B illustrate imaging of an object by an imaging objective onto the image sensor of FIG. 1, when the object is in focus of the imaging system, according to an embodiment.
Figure 2B:
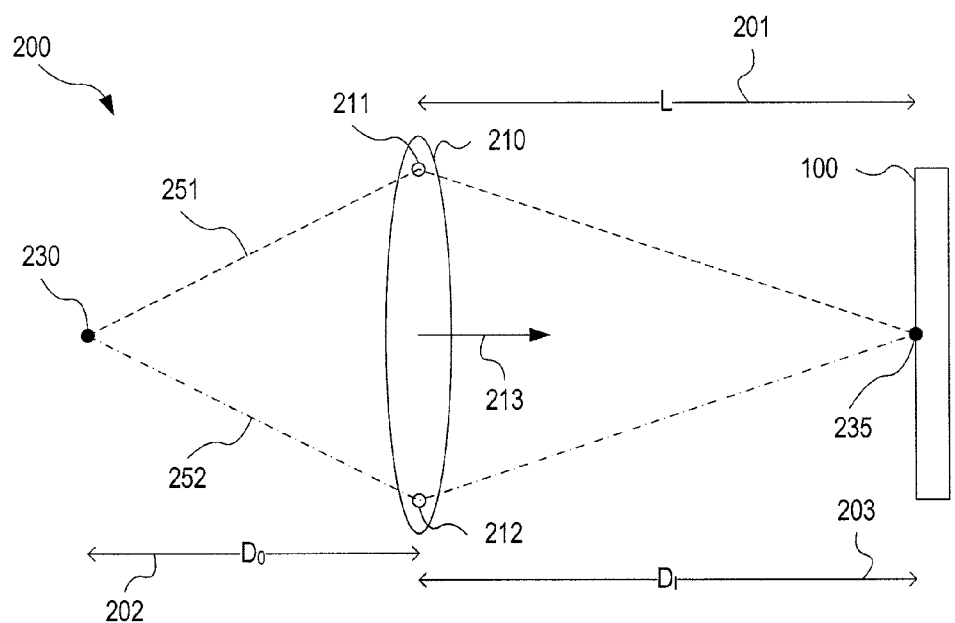

FIGS. 2A and 2B show a diagram 200 that illustrates imaging of an object 230 by imaging objective 210 onto image sensor 100, when object 230 is in focus of the imaging system. FIG. 2A shows diagram 200 in perspective view, while FIG. 2B shows diagram 200 in cross-sectional view. FIGS. 2A and 2B are best view together. Exemplary portions 211 and 212 of an imaging objective 210 are located on opposite sides of the optical axis 213 of imaging objective 210. Portions 211 and 212 define two rays, or ray bundles, 251 and 252 propagating from an object 230 towards an image sensor 100. Rays 251 propagate from object 230 to image sensor 100 through portion 211 of imaging objective 210. Similarly, rays 252 propagate from object 230 to image sensor 100 through portion 212 of imaging objective 210. While FIGS. 2A and 2B illustrate object 230 as being located on optical axis 213, object 230 may be located away from optical axis 213, without departing from the scope hereof.

Imaging objective 210 has a focal length f. Assuming that imaging objective 210 is a thin lens, the thin lens equation dictates that $$\frac{1}{f} = \frac{1}{D_O} + \frac{1}{D_I}, \qquad \text{(EQ. 1)}$$

where $D_O$ is the distance 202 from an object to imaging objective 210 and $D_I$ is the distance 203 from imaging objective 210 to a focused image of the object. In diagram 200, imaging objective 210 is at a distance 201, denoted L, from image sensor 100, where $L=D_I$. Therefore, object 230 is in focus of the imaging system formed by imaging objective 210 and image sensor 100, and the images formed on image sensor 100 by portions 211 and 212 coincide to yield a single image 235.

Figure 3A:
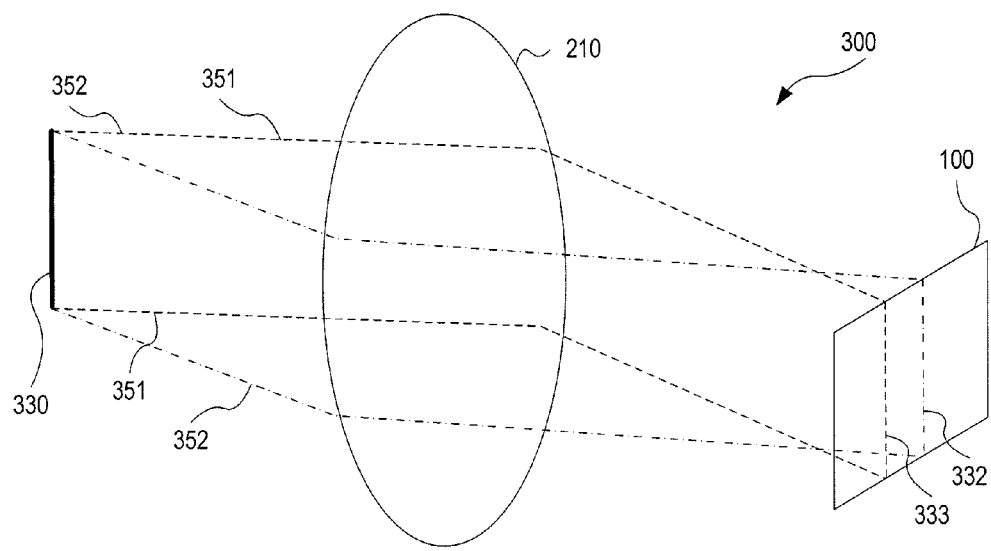
FIGS. 3A and 3B illustrate imaging of an object by an imaging objective onto the image sensor of FIG. 1, when the object is more distant than being in focus of the imaging system, according to an embodiment.
Figure 3B:
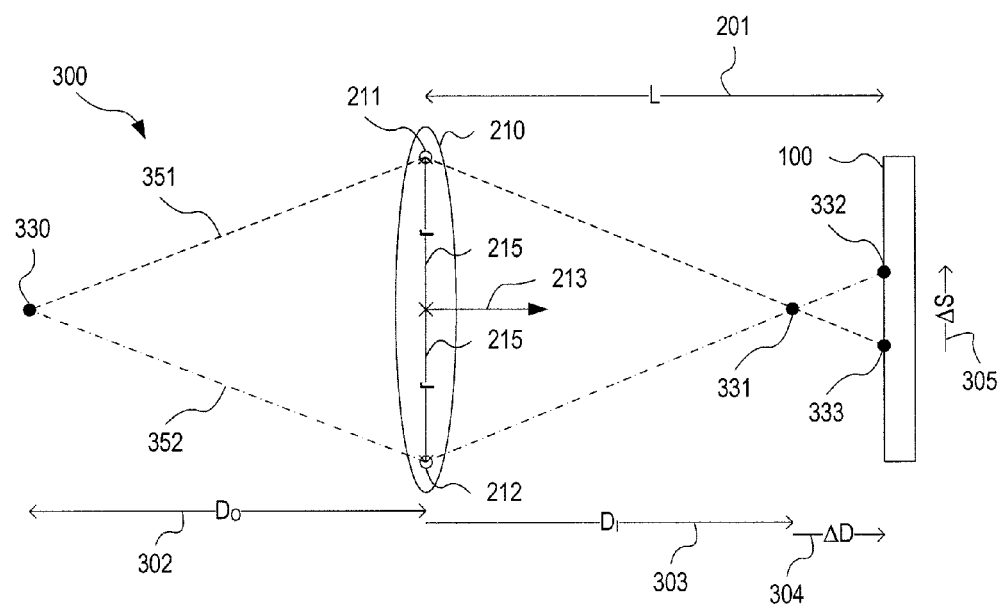

FIGS. 3A and 3B show a diagram 300 that illustrates imaging of an object 330 by the imaging system of FIGS. 2A and 2B, where object 330 is more distant than being in focus of the imaging system. FIG. 3A shows diagram 300 in perspective view, while FIG. 3B shows diagram 300 in cross-sectional view. FIGS. 3A and 3B are best view together. Object 330 is at a distance 302 from imaging objective 210, where distance 302 is greater than distance 202. While FIGS. 3A and 3B illustrate object 330 as being located on optical axis 213, object 330 may be located away from optical axis 213, without departing from the scope hereof. Rays 351 and 352 propagating from object 330 through imaging objective portions 211 and 212 (FIGS. 2A and 2B), respectively, to image sensor 100 (FIGS. 2A and 2B) intersect at a point 331. According to EQ. 1, since distance 302 ($D_O$) is greater than distance 202, distance 303 ($D_I$) is less than distance 203. Hence, point 331 is located between imaging objective 210 and image sensor 100 at a distance 304, denoted AD, from image sensor 100. Consequently, as illustrated by rays 351 and 352, imaging objective portions 211 and 212 form respective images 332 and 333 on image sensor 100. Images 332 and 333 are apart from each other by a distance 305. Distance 305 corresponds to the misfocus-induced phase shift ΔS between images 332 and 333.

Figure 4A:
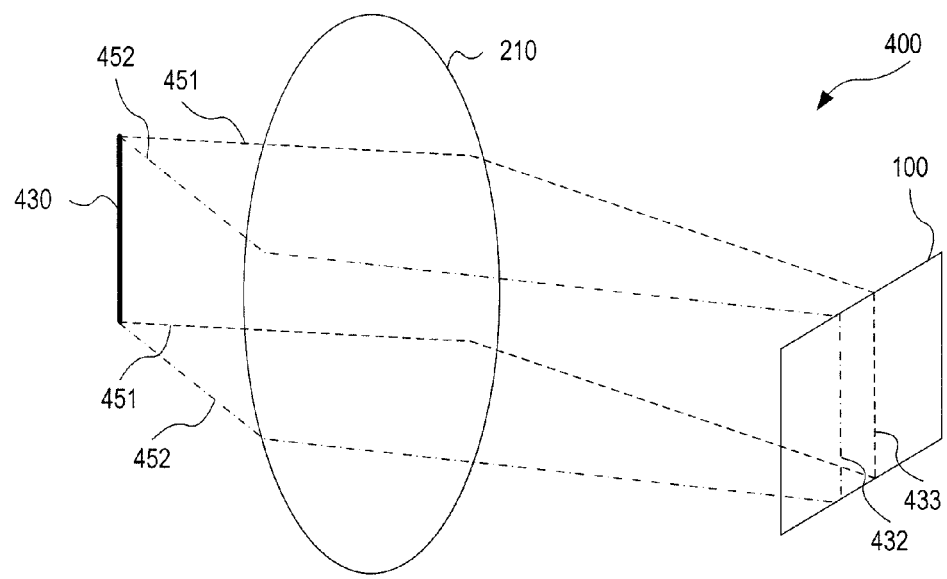
FIGS. 4A and 4B illustrate imaging of an object by an imaging objective onto the image sensor of FIG. 1, when the object is less distant than being in focus of the imaging system, according to an embodiment.
Figure 4B:
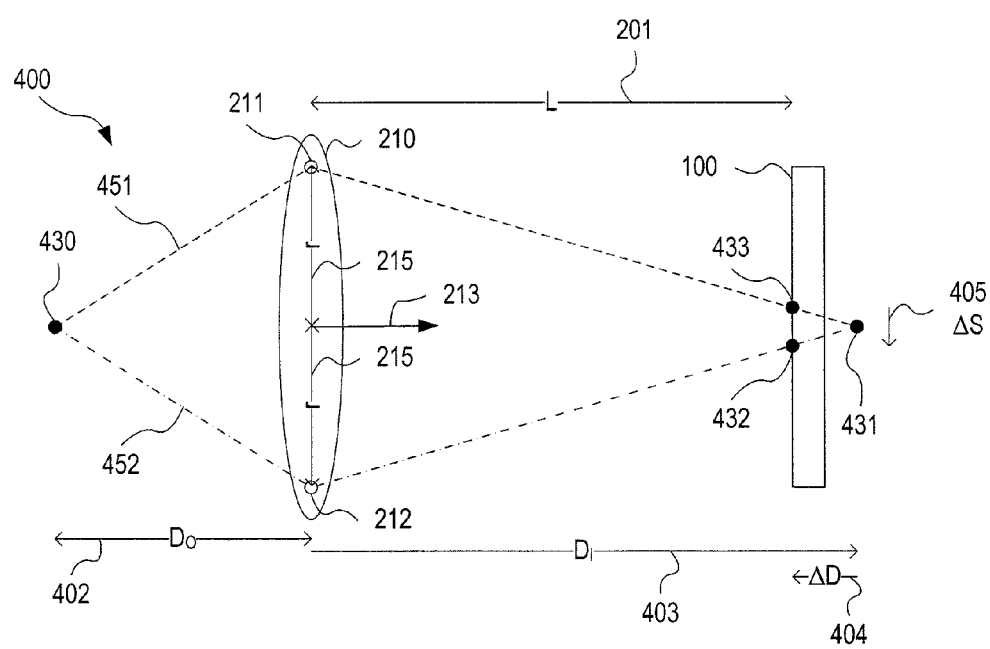

FIGS. 4A and 4B show a diagram 400 that illustrates imaging of an object 430 by the imaging system of FIGS. 2A and 2B, where object 430 is less distant than being in focus of the imaging system. FIG. 4A shows diagram 400 in perspective view, while FIG. 4B shows diagram 400 in cross-sectional view. FIGS. 4A and 4B are best view together. Object 430 is at a distance 402 from imaging objective 210, where distance 402 is greater than distance 202. While FIGS. 4A and 4B illustrate object 430 as being located on optical axis 213, object 430 may be located away from optical axis 213, without departing from the scope hereof. Rays 451 and 452 propagate from object 430 through imaging objective portions 211 and 212, respectively, to image sensor 100 and intersect at a point 431. According to EQ. 1, since distance 402 ($D_O$) is less than distance 202, distance 403 ($D_f$) is greater than distance 203. Hence, point 431 is located beyond image sensor 100 by a distance 404, denoted $\Delta D$, from the photosensitive surface of image sensor 100. Consequently, as illustrated by rays 451 and 452, imaging objective portions 211 and 212 form respective images 432 and 433 on image sensor 100. Images 432 and 433 are apart from each other by a distance 405. Distance 405 corresponds to the misfocus-induced phase shift $\Delta S$ between images 432 and 433.

Diagram 200 (FIGS. 2A and 2B), diagram 300 (FIGS. 3A and 3B), and diagram 400 (FIGS. 4A and 4B) illustrate that misfocus, of the imaging system composed of imaging objective 210 and image sensor 100, results in a phase shift between light propagating to image sensor 100 through different portions of imaging objective 210. Image sensor 100 is configured to measure this phase shift. An associated autofocus function may adjust imaging objective 210 to minimize or reduce the phase shift, and thereby focus the imaging system on an object.

While FIGS. 2A, 2B, 3A, 3B, 4A, and 4B show imaging objective 210 as being a thin lens, imaging objective 210 may be a thick lens or a multi-lens objective without departing from the scope hereof.

Figure 5:
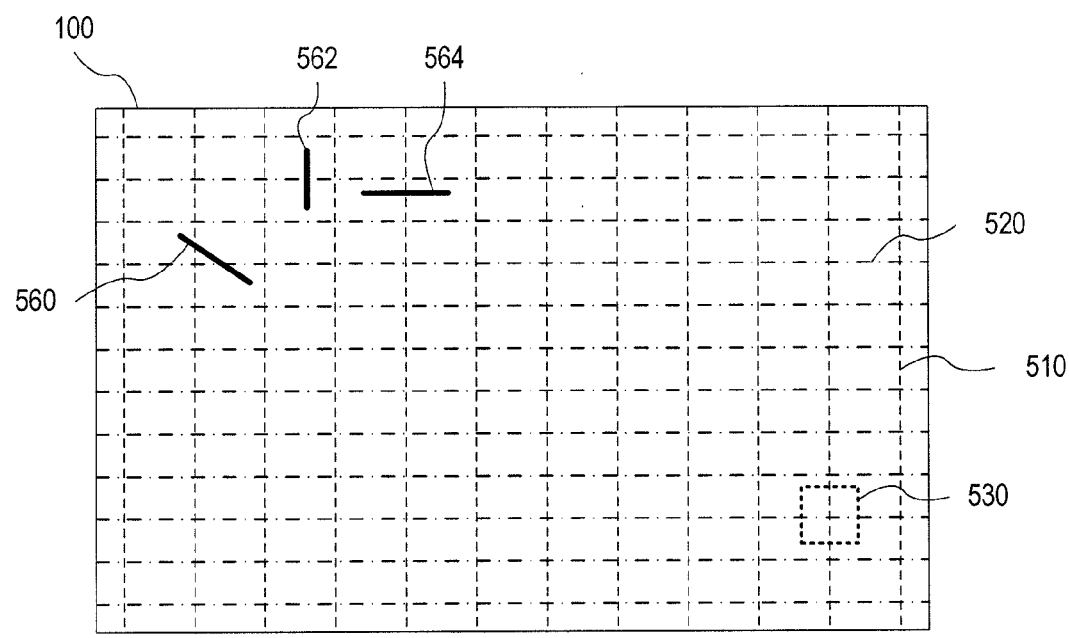
FIG. 5 illustrates the image sensor of FIG. 1 in further detail, according to an embodiment.
Figure 6:
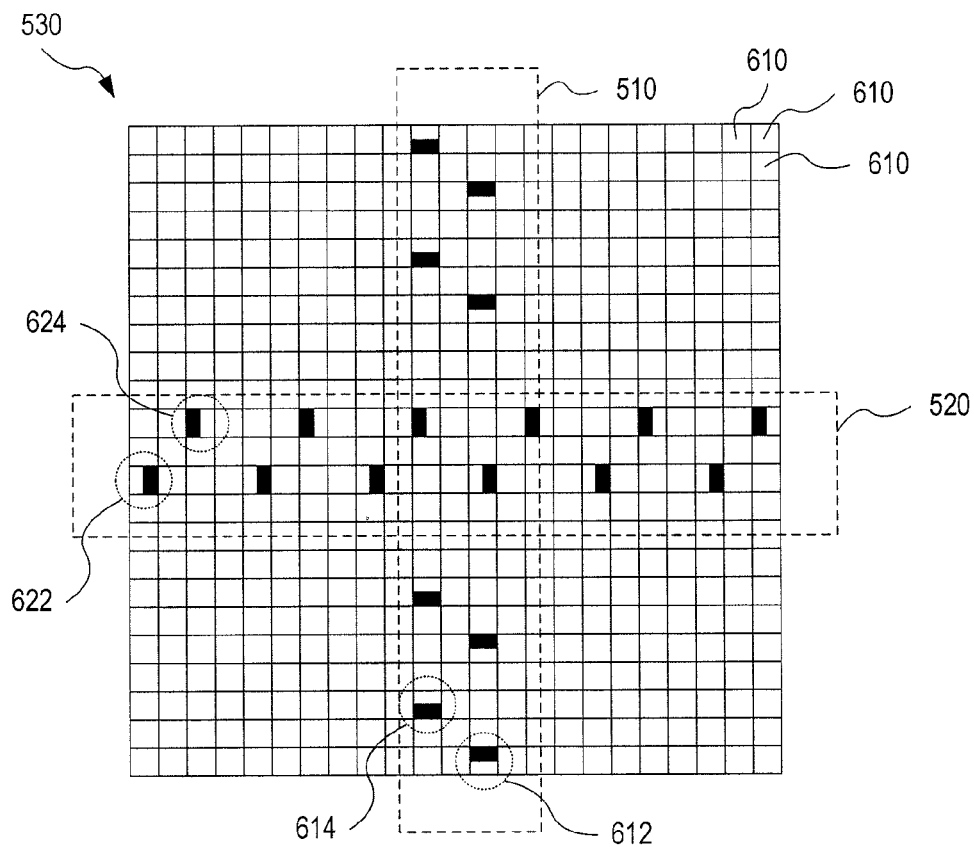
FIG. 6 illustrates a portion of the image sensor of FIG. 1 in yet further detail, according to an embodiment.

FIG. 5 illustrates image sensor 100 (FIG. 1) in more detail than shown in FIG. 1. FIG. 6 illustrates one exemplary portion 530 of image sensor 100 in further detail. FIGS. 5 and 6 are best viewed together.

Image sensor 100 includes an array of pixels 610. For clarity of illustration, individual pixels 610 are not show in FIG. 5, and not all pixels 610 are labeled in FIG. 6. Each pixel 610 generates an electrical signal in response to light incident on the pixel. The array of pixels 610 cooperate to generate an electronic image of an optical image formed on image sensor 100, for example by imaging objective 210 (see, e.g., FIG. 2A).

Some, but not all, of pixels 610 are masked to form phase-detection pixels: top-masked pixels 612, bottom-masked pixels 614, right-masked pixels 622, and left-masked pixels 624. For clarity of illustration, not all top-masked pixels 612, bottom-masked pixels 614, right-masked pixels 622, and left-masked pixels 624 are labeled in FIG. 6. Top-masked pixel 612 is a pixel 610 having a top portion masked to preferably detect light incident on top-masked pixel 612 from a down direction, i.e., light propagating upwards. Bottom-masked pixel 614 is a pixel 610 having a bottom portion masked to preferably detect light incident on bottom-masked pixel 614 from an up direction, i.e., light propagating downwards. Right-masked pixel 622 is a pixel 610 having a right portion masked to preferably detect light incident on right-masked pixel 622 from a left direction, i.e., light propagating from left to right. Left-masked pixel 624 is a pixel 610 having a left portion masked to preferably detect light incident on left-masked pixel 624 from a right direction, i.e., light propagating from right to left.

Without departing from the scope hereof, top-masked pixels 612 may be configured to preferably detect light from an up direction, and bottom-masked pixels 614 may be configured to preferably detect light from a down direction. Similarly, right-masked pixels 622 may be configured to detect light from a right direction, and left-masked pixels 624 may be configured to detect light from a left direction.

The array of pixels 610 includes (a) a plurality of phase-detection columns 510 oriented along a vertical dimension of the array of pixels 610, and (b) a plurality of phase-detection rows 520 oriented along a horizontal dimension of the array of pixels 610.

Herein, "vertical" and "horizontal" refer to two orthogonal dimensions of the array of pixels 610. However, "vertical" and "horizontal" are not intended to refer to any particular directions relative to the direction of gravity. Likewise, it is understood that "up", "down", "left", "right", "top, and "bottom" do not necessarily relate to the direction of gravity. Rather, "up" is opposite "down", "top" is opposite "bottom", "left" is opposite "right", "left" and "right" are associated with the "horizontal" dimension, while "top", "bottom", "up", and "down" are associated with the "vertical" dimension. The top potion of pixel 610 is more towards the top of pixel 610 than the bottom portion of pixel 610, and the bottom portion of pixel 610 is more towards the bottom of pixel 610. The top portion of pixel 610 need not extend to the top extreme of pixel 610, and the bottom portion of pixel 610 need not extend to the bottom extreme of pixel 610. The top and bottom portions may overlap. Without departing from the scope hereof, light incident from the up direction may include a minority light fraction that is incident from the down direction, and light incident from the down direction may include a minority light fraction that is incident from the up direction. The left portion of pixel 610 is more towards the left of pixel 610 than the right portion of pixel 610, and the right portion of pixel 610 is more towards to right of pixel 610 than the left portion of pixel 610. The left portion of pixel 610 need not extend to the left-most extreme of pixel 610, and the right portion of pixel 610 need not extend to the right-most extreme of pixel 610. The left and right portions may overlap. Without departing from the scope hereof, light incident from the left direction may include a minority light fraction that is incident from the right direction, and light incident from the right direction may include a minority light fraction that is incident from the left direction. In an embodiment, the "vertical" and "horizontal" dimensions are parallel to orthogonal sides of the array of pixels 610, respectively, as illustrated in FIGS. 5 and 6.

Phase-detection column 510 includes a plurality of top-masked pixels 612 and a plurality of bottom-masked pixels 614. Through use of top-masked pixels 612 and bottom-masked pixels 614, phase-detection column 510 provides a measurement of the phase-shift between (a) light incident upon phase-detection column 510 from a down direction and (b) light incident upon phase-detection column 510 from an up direction. If an edge in scene 150 is imaged onto image sensor 100 at phase-detection column 510, and the image of this edge is not parallel to phase-detection column 510, a line profile taken along phase-detection column 510 indicates the edge. Following from the discussion in reference to FIGS. 2A, 2B, 3A, 3B, 4A, and 4B, a misfocused image of the edge will result in a phase shift between (a) a line profile generated by top-masked pixels 612 and (b) a line profile generated by bottom-masked pixels 614. Hence, phase-detection column 510 enables detection, and associated phase-shift measurement, of edge images that overlap with phase-detection column 510 and are not parallel to phase-detection column 510 at the location of the overlap.

Phase-detection column 510 may include several vertical columns of pixels 610, as shown in FIG. 6. However, without departing from the scope hereof, phase-detection column 510 may include only a single vertical column of pixels 610. Within phase-detection column 510, in one embodiment, top-masked pixels 612 are arranged along a vertical line, and bottom-masked pixels 614 are arranged along a vertical line. In this embodiment, top-masked pixels 612 and bottom-masked pixels 614 may be arranged along the same vertical line or along two different vertical lines (as shown in FIG. 6).

Phase-detection row 520 includes a plurality of right-masked pixels 622 and a plurality of left-masked pixels 624. Similar to the above discussion of phase-detection column 510, phase-detection row 520 enables detection, and associated phase-shift measurement, of edge images that overlap with phase-detection row 520 and are not parallel to phase-detection row 520 at the location of the overlap.

Phase-detection row 520 may include several horizontal rows of pixels 610, as shown in FIG. 6. However, without departing from the scope hereof, phase-detection row 520 may include only a single horizontal row of pixels 610. Within phase-detection row 520, in one embodiment, right-masked pixels 622 are arranged along a horizontal line, and left-masked pixels 624 are arranged along a horizontal line. In this embodiment, right-masked pixels 622 and left-masked pixels 624 may be arranged along the same horizontal line or along two different horizontal lines (as shown in FIG. 6).

In certain embodiments, top-masked pixels 612 and bottom-masked pixels 614, of each phase-detection column 510, are arranged in a vertically oriented series of phase-detection pixel pairs, wherein each phase-detection pixel pair includes one top-masked pixel 612 and one bottom-masked pixel 614. In these embodiments, right-masked pixels 622 and left-masked pixels 624, of each phase-detection row 520, are arranged in a horizontally oriented series of phase-detection pixel pairs, wherein each phase-detection pixel pair includes one right-masked pixel 622 and one left-masked pixel 624.

Each phase-detection column 510 and each phase-detection row 520 includes pixels 610 that are not phase-detection pixels. These non-phase-detection pixels provide light detection that is not reduced by phase-detection associated masks, and the non-phase-detection pixels therefore have greater light-collection efficiency than the phase-detection pixels. Furthermore, electrical signals generated by the phase-detection pixels may be corrected based upon electrical signals generated by adjacent non-phase-detection pixels, such that an electronic image generated by image sensor 100 is substantially free of artifacts associated with the phase-detection pixels. For the purpose of the present disclosure, "adjacent" pixels refer to nearest-neighbor pixels such that a pixel, located away from the perimeter of the pixel array, has eight adjacent pixels. Correction based upon adjacent pixels is more accurate than correction based upon pixels further away. Therefore, it is beneficial to space apart phase-detection pixels such that each phase-detection pixel has several adjacent non-phase-detection pixels. Preferably, each phase-detection pixel, located away from the pixel array perimeter, has adjacent non-phase-detection pixels located in several different directions from the phase-detection pixel. In one embodiment of the array of pixels 610, for each phase-detection pixel located away from the perimeter of the array of pixels 610, the majority of adjacent pixels 610 are non-phase-detection pixels.

In another embodiment, all pixels 610 adjacent to each top-masked pixel 612, all pixels 610 adjacent to each bottom-masked pixel 614, all pixels 610 adjacent to each right-masked pixel 622, and all pixels 610 adjacent to each left-masked pixel 624 are a non-phase-detection pixels. In yet another embodiment, each top-masked pixel 612, each bottom-masked pixel 614, each right-masked pixel 622, and each left-masked pixel 624 is adjacent to at least one non-phase-detection pixel.

The plurality of phase-detection columns 510 intersects with the plurality of phase-detection rows 520 to enable (a) detection of arbitrarily oriented edges in scene 150, such as a scene edge producing an arbitrarily oriented edge 560 on image sensor 100, and (b) measurement of phase shifts (as discussed in connection with FIGS. 3A, 3B, 4A, and 4B) associated with misfocus of such edges. With this configuration of phase-detection columns 510 and phase-detection rows 520, image sensor 100 is able to measure phase shifts associated with (a) vertical edges, such as vertical edge 562 shown in FIG. 5, horizontal edges, such as horizontal edge 564 shown in FIG. 5, and (c) edges of orientation that is neither vertical nor horizontal. Herein, a phase-shift measurement may refer to a measurement of the magnitude of a phase shift, for example indicated in distance or number of pixels, or a determination of whether a phase shift is zero or different from zero.

Each phase-detection column 510 and each phase-detection row 520 substantially spans the extent of the array of pixels 610 in a corresponding dimension. In an embodiment, phase-detection columns 510 and phase-detection rows 520 are arranged to provide substantially uniform coverage of the array of pixels 610. Such embodiments of image sensor 100 may be capable of measuring misfocus-induced phase shifts associated with arbitrarily oriented edges having arbitrary location within an image of scene 150 formed on image sensor 100, wherein the edge has (a) horizontal extent at least as long as the horizontal spacing between phase-detection columns 510 and (b) vertical extent at least as long as the vertical spacing between phase-detection rows 520. Smaller spacing between phase-detection columns 510 and smaller spacing between phase-detection rows 520 enable phase-shift measurement for smaller edges in scene 150. However, smaller spacing between phase-detection columns 510 and smaller spacing between phase-detection rows 520 may increase the density of phase-detection pixels in the array of pixels 610. In turn, this increased density decreases the overall amount of light collected by image sensor 100 and also increases the number of pixels, in an electronic image generated by image sensor 100, that must be corrected for the partial masking of the associated phase-detection pixel. Accordingly, there may be a trade-off between the detectable feature size in scene 150 and the non-focus related image quality achievable by image sensor 100. In one example, image sensor 100 includes at least ten phase-detection columns 510 and at least ten phase-detection rows 520, such as twelve phase-detection columns 510 and twelve phase-detection rows 520.

Without departing from the scope hereof, pixel 610 may be arranged in on a hexagonal lattice, such that each pair of neighboring rows of pixels 610 are displaced from each other, in the horizontal dimension, by half a pixel spacing.

Figure 7:
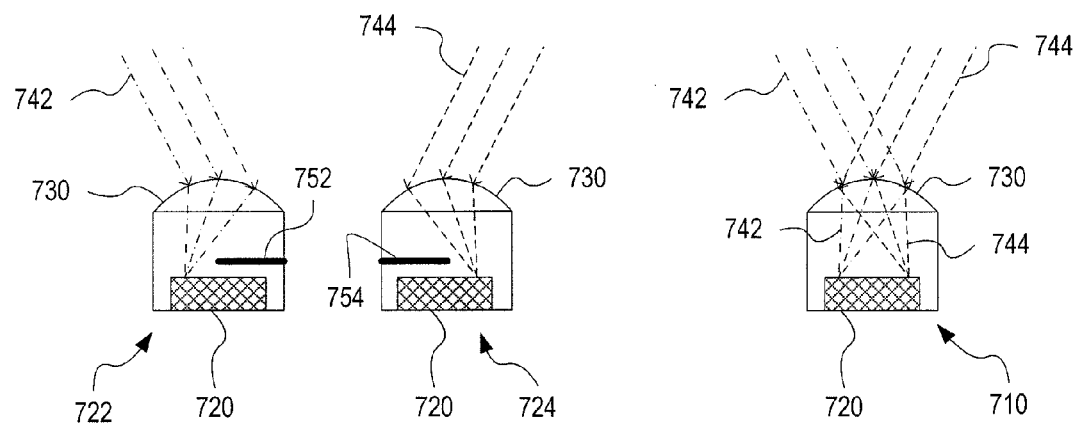
FIG. 7 illustrates phase-detection pixels and exemplary non-phase-detection pixels of the image sensor of FIG. 1, according to an embodiment.

FIG. 7 illustrates exemplary phase-detection pixels, 722 and 724, and exemplary non-phase-detection pixels 710 of image sensor 100. Non-phase-detection pixel 710 is an embodiment of non-phase-detection pixels in the array of pixels 610 (FIG. 6). Phase-detection pixel 722 is an embodiment of right-masked pixel 622 (FIG. 6). Phase-detection pixel 724 is an embodiment of left-masked pixel 624 (FIG. 6).

Non-phase-detection pixel 710 includes a photosensitive element 720 and a lens 730 that focuses light incident on non-phase-detection pixel 710 onto photosensitive element 720. Photosensitive element 720 is, for example, a photodiode. Lens 730 refracts light 742 from a left direction onto a left portion of photosensitive element 720. Lens 730 refracts light 744 from a right direction onto a right portion of photosensitive element 720. Non-phase-detection pixel 710 is sensitive to both light 742 and light 744.

As compared to non-phase-detection pixel 710, right-masked pixel 722 additionally includes a mask 752. Mask 752 covers a right portion of photosensitive element 720 and thereby blocks light 744. Thus, right-masked pixel 722 is sensitive only to light 742 and not to light 744. Similarly, as compared to non-phase-detection pixel 710, left-masked pixel 724 additionally includes a mask 754 that allows only light 744 to reach photosensitive element 720. Thus, left-masked pixel 724 is sensitive only to light 744 and not to light 742. Without departing from the scope hereof, mask 752 may be located elsewhere in right-masked pixel 722, as long as mask 752 predominantly blocks light 744. Similarly, mask 754 may be located elsewhere in left-masked pixel 724, as long as mask 755 predominantly blocks light 742.

Although not illustrated in FIG. 7, embodiments of top-masked pixel 612 and bottom-masked pixel 614 may be formed by masking top and bottom portions, respectively, of photosensitive element 720 of non-phase-detection pixel 710.

Actual light propagation through microlens 730 may differ from that shown in FIG. 7. For example, microlens 730 may have shorter or longer focal length than the focal length indicated in FIG. 7. Additionally, microlens 730 may be configured to direct light 742 onto the right portion of photosensitive element 720 and light 744 onto the left portion of photosensitive element 720, such that right-masked pixel 722 is predominantly sensitive to light 744 and left-masked pixel 724 is predominantly sensitive to light 742.

Figure 8:
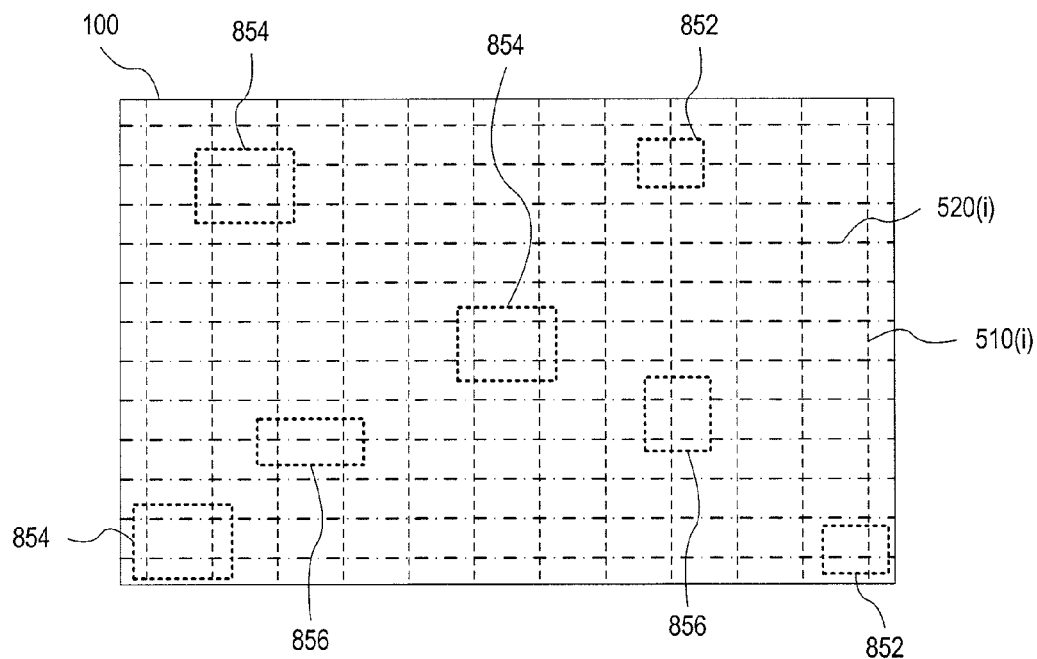
FIG. 8 illustrates phase-detection regions of interest within the image sensor of FIG. 1, according to an embodiment.

FIG. 8 illustrates exemplary phase-detection regions of interest (ROI) 852, 854, and 856 within image sensor 100 (FIG. 1). Phase-detection ROIs 852, 854, and 856 are compatible with phase-shift measurements for arbitrarily oriented edges similar to arbitrarily oriented edge 560 (FIG. 5). Each of phase-detection ROIs 852, 854, and 854 includes at least a portion of at least one phase-detection column 510 and at least a portion of at least one phase-detection row 520. Each of phase-detection ROIs 852, 854, and 854 enable detection of an arbitrarily oriented edge.

Exemplary ROIs 852 each include a portion of one phase-detection column 510 and a portion of one phase-detection row 520. Each of ROIs 852 are rectangular and include the intersection between the portion of one phase-detection column 510 and the portion of one phase-detection row 520. Exemplary ROIs 854 each include portions of two phase-detection columns 510 and portions of two phase-detection rows 520. Each of ROIs 854 are rectangular and include four intersections between the portions of phase-detection columns 510 and phase-detection rows 520. Exemplary ROIs 856 each include two intersections between phase-detection columns 510 and phase-detection rows 520. ROIs 852, 854, and 856 may be located anywhere within the grid formed by phase-detection columns 510 and phase-detection rows 520. For embodiments of image sensor 100, wherein phase-detection columns 510 and phase-detection rows 520 span the full extent of respective dimensions of the array of pixels 610 (FIG. 6), ROIs 852, 854, and 846 may be located anywhere within the array of pixels 610.

Image sensor 100 is configured to facilitate a great variety of phase-detection ROIs compatible with detection of edges of arbitrary orientation. This flexibility adds to the robustness of phase detection using image sensor 100 and, thus, adds to the robustness of an associated autofocus function. For example, ROIs 852, 854, and 856 may be located anywhere within the grid formed by phase-detection columns 510 and phase-detection rows 520. For embodiments of image sensor 100, wherein phase-detection columns 510 and phase-detection rows 520 span the full extent of respective dimensions of the array of pixels 610 (FIG. 6), ROIs 852, 854, and 846 may be located anywhere within the array of pixels 610. Furthermore, image sensor 100 is compatible with phase-detection ROIs of shape and/or size different from those shown in FIG. 8. Additionally, image sensor 100 enables (a) simultaneous phase detection for multiple edges and/or (b) several phase measurements for any given edge if such an edge overlaps with more than one phase-detection row/column.

Figure 9:
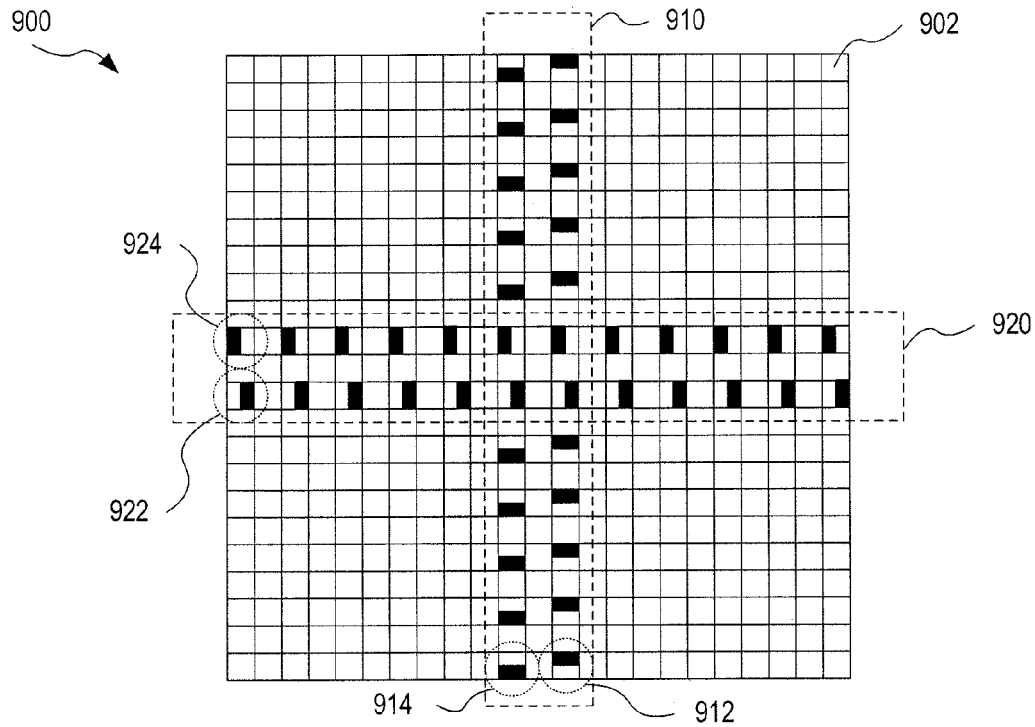
FIG. 9 illustrates a portion of a monochrome image sensor with robust on-chip phase-detection, according to an embodiment.

FIG. 9 illustrates a portion of one exemplary monochrome image sensor 900 with robust on-chip phase-detection. Monochrome image sensor 900 is a monochrome embodiment of image sensor 100 (FIG. 1), which is capable of generating grayscale images of scene 150. Monochrome image sensor 900 includes a plurality of phase-detection columns 910 and a plurality of phase-detection rows 920. FIG. 9 shows a portion of monochrome image sensor 900 similar to portion 530 (FIG. 5) of image sensor 100. Monochrome image sensor 900 includes an array of pixels 902. All of pixels 902 have substantially identical color-sensitivity. In one example, each pixel 902 is sensitive to visible light. Pixel 902 is an embodiment of pixel 610 (FIG. 6).

The array of pixels 902 includes a plurality of phase-detection columns 910 and a plurality of phase-detection rows 920. Phase-detection column 910 and phase-detection row 920 are embodiments of phase-detection column 510 and phase-detection row 520, respectively. Phase-detection column 910 includes phase-detection pixels, top-masked pixels 912 and bottom-masked pixels 914, formed by partially masking some of pixels 902, for example as discussed in reference to FIG. 7. Top-masked pixel 912 and bottom-masked pixel 914 are embodiments of top-masked pixel 612 and bottom-masked pixel 614, respectively. Phase-detection row 920 includes phase-detection pixels, right-masked pixels 922 and left-masked pixels 924, formed by partially masking some of pixels 902, for example as discussed in reference to FIG. 7. Right-masked pixel 922 and left-masked pixel 924 are embodiments of right-masked pixel 622 and left-masked pixel 624, respectively.

All pixels 902, adjacent to a phase-detection pixel, are non-phase detection pixels. Similar to the discussion in reference to FIG. 6, this configuration facilitates correcting the contribution from each phase-detection pixels to an electronic grayscale image, generated by monochrome image sensor 900, based upon signals generated by adjacent non-phase-detection pixels. The contribution to an electronic image from a phase-detection pixel, located away from the perimeter of the array of pixels 902, may be corrected based upon signals generated by up to nine adjacent pixels 902 that do include phase-detection pixels.

Figure 10:
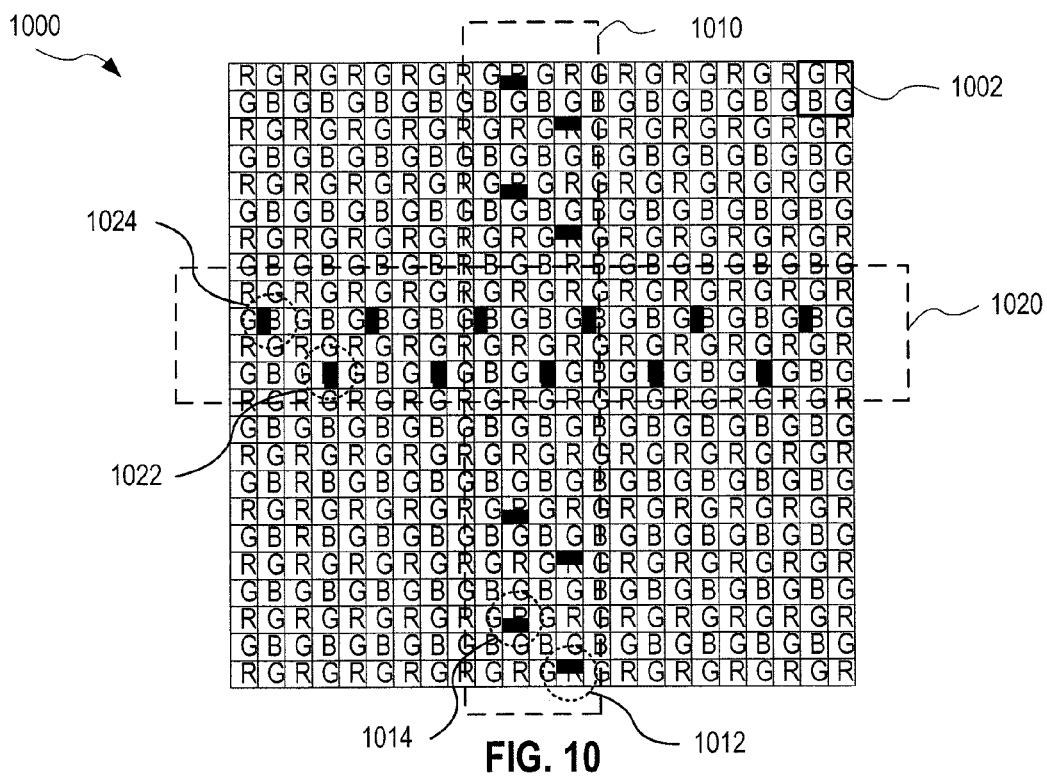
FIG. 10 illustrates a portion of a color image sensor with robust on-chip phase-detection, according to an embodiment.

FIG. 10 illustrates a portion of one exemplary color image sensor 1000 with robust on-chip phase-detection. Color image sensor 1000 is a color-sensitive embodiment of image sensor 100 (FIG. 1), which is capable of generating color images of scene 150. Color image sensor 1000 includes a plurality of phase-detection columns 1010 and a plurality of phase-detection rows 1020. FIG. 10 shows a portion of color image sensor 1000 similar to portion 530 (FIG. 5) of image sensor 100. Color image sensor 1000 includes an array of color pixel groups 1002. Each color pixel group 1002 includes pixels of different color sensitivities and generates electrical signals, in response to incident light, that may be processed to determine the color of the incident light. For clarity of illustration, only one color pixel group 1002 is labeled in FIG. 10.

In the example shown in FIG. 10, color pixel group 1002 is configured according to the Bayer pattern, such that each color pixel group 1002 includes one pixel R sensitive to red light, one pixel B sensitive to blue light, and two pixels G sensitive to green light. Each pixel R, G, and B is an embodiment of pixel 610 (FIG. 6). Without departing from the scope hereof, color pixel group 1002 may be configured differently. In one such example, color pixel group 1002 is configured according to a CYGM pattern with one pixel sensitive to cyan light, one pixel sensitive to yellow light, one pixel sensitive to green light, and one pixel sensitive to magenta light.

The array of color pixel groups 1002 includes a plurality of phase-detection columns 1010 and a plurality of phase-detection rows 1020. Phase-detection column 1010 and phase-detection row 1020 are embodiments of phase-detection column 510 and phase-detection row 520, respectively. Phase-detection column 910 includes phase-detection pixels, top-masked pixels 1012 and bottom-masked pixels 1014, formed by partially masking some of pixels R, for example as discussed in reference to FIG. 7. For clarity of illustration, not all top-masked pixels 1012 and bottom-masked pixels 1014 are labeled in FIG. 10. Top-masked pixel 1012 and bottom-masked pixel 1014 are embodiments of top-masked pixel 612 and bottom-masked pixel 614, respectively. Phase-detection row 1020 includes phase-detection pixels, right-masked pixels 1022 and left-masked pixels 1024, formed by partially masking some of pixels B, for example as discussed in reference to FIG. 7. For clarity of illustration, not all right-masked pixels 1022 and left-masked pixels 1024 are labeled in FIG. 10. Right-masked pixel 1022 and left-masked pixel 1024 are embodiments of right-masked pixel 622 and left-masked pixel 624, respectively.

Without departing from the scope hereof, top-masked pixels 1012 and bottom-masked pixels 1014 may be formed by partially masking some of pixels B, or by partially masking some of pixels G. Likewise, right-masked pixels 1022 and left-masked pixels 1024 may be formed by partially masking some of pixels R, or by partially masking some of pixels G.

All pixels R, G, and B, adjacent to a phase-detection pixel, are non-phase detection pixels. Furthermore, each color pixel group 1002, including a phase-detection pixel, is adjacent to at least one color pixel group 1002 that does not include a phase-detection pixel. Similar to the discussion in reference to FIG. 6, this configuration facilitates correcting contribution to electronic color images, generated by color image sensor 1000, from each color pixel group 1002 that includes a phase-detection pixel. This correction may, for each such color pixel group 1002, be based upon signals generated by at least one adjacent color pixel group 1002 that does not include a phase-detection pixel. For the purpose of the present disclosure, "adjacent" pixel groups refer to nearest-neighbor pixel groups such that a pixel group, located way from the perimeter of the pixel array, has nine adjacent pixel groups. In one embodiment, each color pixel group 1002, including a phase-detection pixel, is adjacent to at most two other color pixel groups 1002 that includes a phase-detection pixel. In this embodiment, the contribution to an electronic color image from a color pixel group 1002, located away from the perimeter of the array of color pixel groups 1002 and having a phase-detection pixel, may be corrected based upon signals generated by up to six adjacent color pixel groups 1002 that do not include phase-detection pixels. In another embodiment, each color pixel group 1002, including a phase-detection pixel, has adjacent color pixel groups 1002, including a phase-detection pixel, in both horizontal and vertical dimensions.

Figure 11:
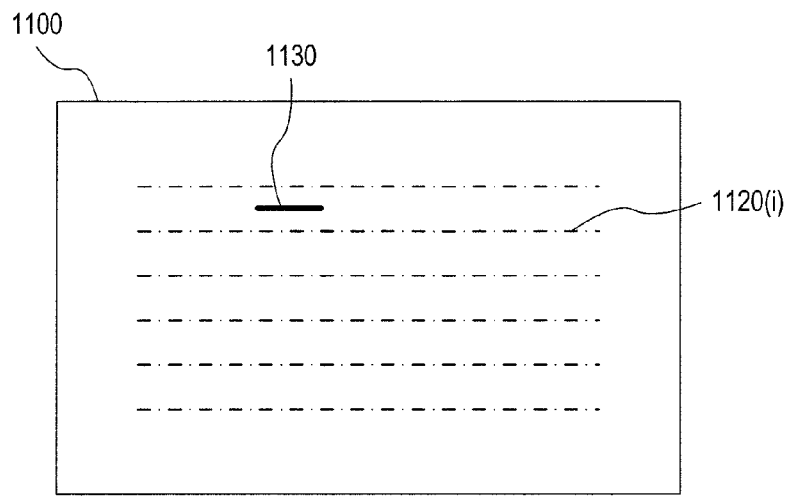
FIG. 11 illustrates a prior art image sensor with on-chip phase-detection.

FIG. 11 illustrates a prior art image sensor 1100 with on-chip phase-detection similar to those disclosed in US 2012/0176532 A1 and US 2013/0088621 A1. Prior art image sensor 1100 includes a plurality of horizontal phase-detection rows 1120. Each horizontal phase-detection row 1120 is composed entirely of phase-detection pixels configured to detect a phase shift along the horizontal dimension. Prior art image sensor 1100 does not include means for detection phase shifts along the vertical dimension. As a result, prior art image sensor 1100 is unable to detect a horizontal edge, such as horizontal edge 1130, and measure a phase shift associated therewith.

Comparing presently disclosed image sensor 100 (FIG. 1) to prior art image sensor 1100, image sensor 100 is capable of detecting arbitrarily oriented edges and measure associated phase-shifts. In addition, image sensor 100 enables improved correction for contribution to electronic images from phase-detection pixels, since phase-detection columns 510 and phase-detection rows 520 includes non-phase-detection pixels intermixed with the phase-detection pixels.

Figure 12:
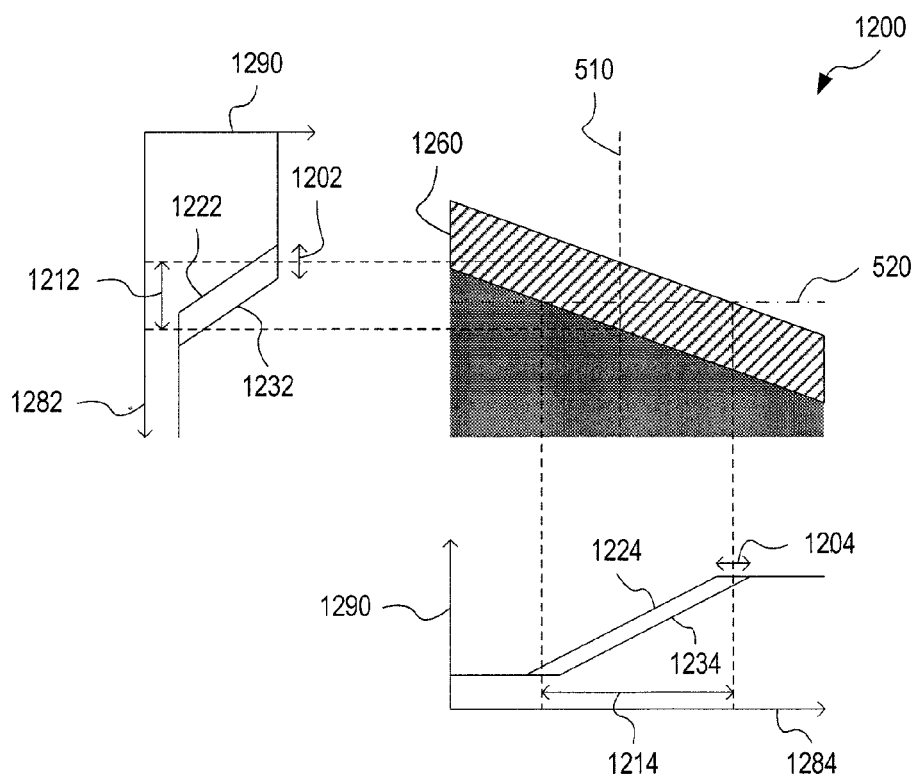
FIG. 12 illustrates detection and phase-shift measurement of an arbitrarily oriented edge by the image sensor of FIG. 1, according to an embodiment.

FIG. 12 illustrates detection and phase-shift measurement of one exemplary arbitrarily oriented edge 1260 by image sensor 100 (FIG. 1). Edge 1260 is an image of a transition between two areas of different brightness and/or color in scene 150. The extent of edge 1260 is determined by (a) the actual extent of the transition in scene 150 and (b) the degree of misfocus of the image of the transition.

Top-masked pixels 612 (FIG. 6) and bottom-masked pixels 614 of a phase-detection column 510 generate electrical signals indicating vertical line profiles 1222 and 1232 for edge 1260 along phase-detection column 510. Line profiles 1222 and 1232 are plotted as brightness and/or color measurement 1290 versus vertical position 1282. Top-masked pixels 612 produce one of vertical line profiles 1222 and 1232, while bottom-masked pixels 614 produce the other one of vertical line profiles 1222 and 1232. Edge 1260 is apparent in each of line profiles 1222 and 1232 as a change in brightness and/or color measurement 1290. Each of line profiles 1222 and 1232 provide a measurement of the extent 1212 of edge 1260 along phase-detection column 510. Together, line profiles 1222 and 1232 provide a measurement of the misfocus-induced phase shift 1202 between line profiles 1222 and 1232.

Right-masked pixels 622 and left-masked pixels 624 of a phase-detection row 520 generate electrical signals indicating horizontal line profiles 1224 and 1234 for edge 1260 along phase-detection row 520. Line profiles 1224 and 1234 are plotted as brightness and/or color measurement 1290 versus horizontal position 1284. Right-masked pixels 622 produce one of horizontal line profiles 1224 and 1234, while left-masked pixels 624 produce the other one of horizontal line profiles 1224 and 1234. Edge 1260 is apparent in each of line profiles 1224 and 1234 as a change in brightness and/or color measurement 1290. Each of line profiles 1224 and 1234 provide a measurement of the extent 1214 of edge 1260 along phase-detection row 520. Together, line profiles 1224 and 1234 provide a measurement of misfocus-induced phase shift 1204 between line profiles 1224 and 1234. If the optical system that images scene 150 onto image sensor 100 is free of astigmatism, misfocus-induced phase shift 1204 is the same as misfocus-induced phase shift 1202. If, on the other hand, the optical system is astigmatic, misfocus-induced phase shift 1204 may be different from misfocus-induced phase shift 1202.

The accuracy, with which misfocus-induced phase shift 1202 may be determined, is a function of the ratio between misfocus-induced phase shift 1202 and extent 1212. Similarly, the accuracy, with which misfocus-induced phase shift 1204 may be determined, is a function of the ratio between misfocus-induced phase shift 1204 and extent 1214. In the example of FIG. 12, edge 1260 has a greater horizontal component than vertical component. Therefore, extent 1212 is significantly smaller than extent 1214. Assuming no or negligible astigmatism, misfocus-induced phase-shift 1202 is the same as misfocus-induced phase-shift 1204. Accordingly, phase-detection column 510 provides a better phase-shift measurement than phase-detection row 520.

The example of FIG. 12 is for an ideal situation. If further accounting for non-idealities, such as noise and/or interfering features in the scene, aberrations of the optical system, and electronic noise of image sensor 100, line profiles 1222, 1232, 1224, and 1234 may be substantially noisier than what is shown in FIG. 12. In such situations, misfocus-induced phase shift 1204 may be undetectable, and only phase-detection column 510 is capable of providing a measurement of the misfocus-induced phase shift associated with edge 1260. Examples of realistic line profiles are shown in FIGS. 21A, 21B, 22A, 22B, 23A, and 23B, discussed below.

It follows from the above discussion that phase-detection column 510 provides a better phase-shift measurement for near-horizontal edges than phase-detection row 520, while phase-detection row 520 provides a better phase-shift measurement for near-vertical edges than phase-detection column 510. It also follows that phase-detection column 510 is unable to enable measurement of the phase shift for vertical edges, and depending on non-ideal properties discussed above, may be unable to enable measurement of the phase shift for near-vertical edges. Likewise, phase-detection row 520 is unable to enable measurement of the phase shift for horizontal edges, and depending on non-ideal properties discussed above, may be unable to enable measurement of the phase shift for near-horizontal edges. Consequently, robust on-chip phase detection requires both phase-detection columns 510 and phase-detection rows 520.

For comparison, prior art image sensor 1100 (FIG. 11) is capable only of measuring horizontal phase shifts using horizontal phase-detection rows. Hence, in terms of multi-directional edge detection and associated phase-shift measurement, the robustness of image sensor 100 exceeds that of prior art image sensor 1100.

Figure 13:
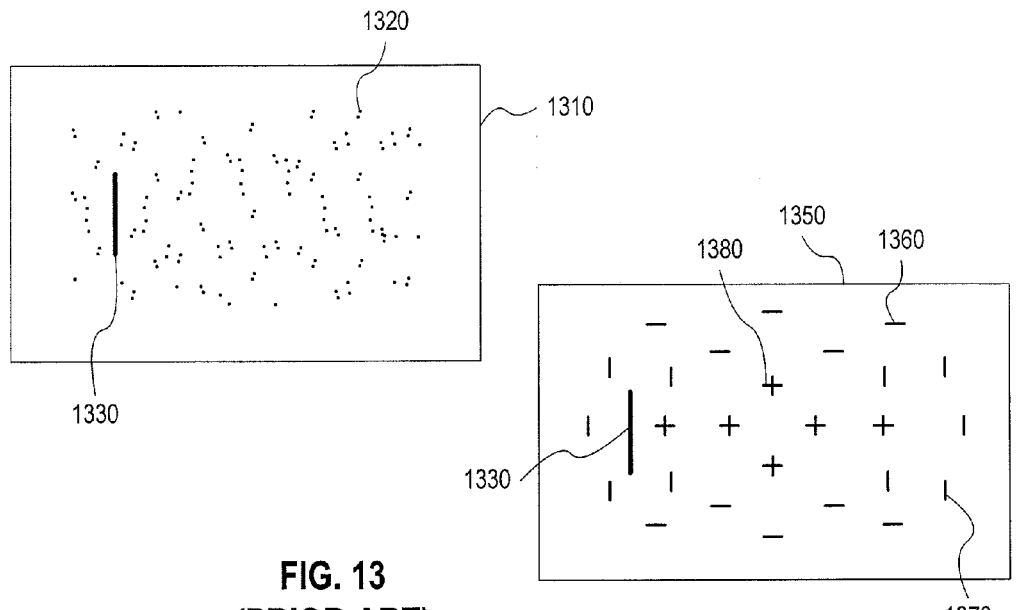
FIG. 13 illustrates two prior art image sensors having on-chip phase detection.

FIG. 13 illustrates two prior art image sensors 1310 and 1350 having on-chip phase detection. Neither prior art image sensor 1310 nor prior art image sensor 1350 has phase-detection rows and/or columns of substantial extent, as compared to the extent of the respective image sensor.

Prior art image sensor 1310 is similar to those disclosed in U.S. Pat. No. 8,259,215 B2 and includes a plurality of dispersed phase-detection pixels 1320. However, any given edge in an image formed on prior art image sensor 1310, such as edge 1330, may coincide with no or just a few phase-detection pixels, and the generation of line profiles is unfeasible. Instead, phase detection using prior art image sensor 1310 relies on quantitative comparison of signals from a relatively small number of phase-detection pixels near an edge. Imperfections, for example the non-idealities discussed in reference to FIG. 12, may adversely affect such phase detection and result in autofocus failure. In comparison, the line profile based phase detection of image sensor 100 (FIG. 1) provides more robust and more accurate phase-shift measurements.

Prior art image sensor 1350 is similar to one disclosed in U.S. Pat. No. 7,924,342 B2 and includes a plurality of dispersed, short lines of phase-detection pixels. The phase-detection pixels of prior art image sensor 1350 are arranged in horizontal lines 1360 for measurement of horizontal phase shifts, vertical lines 1370 for measurement of vertical phase shifts, and crossed vertical and horizontal lines 1380 for measurement of horizontal and vertical phase shifts. Each of horizontal lines 1360, vertical lines 1370 and crossed vertical and horizontal lines 1380 are composed entirely of phase-detection pixels. In comparison, each of phase-detection columns 510 and phase-detection rows 520 of image sensor 100 includes non-phase-detection pixels that may be used to correct image artifacts caused by the phase-detection pixels. The configuration of the array of pixels 610 provides for improved correction for each phase-detection pixel, as compared to prior art image sensor 1350. Substantial portions of prior art image sensor 1350 have no phase-detection capability. Such non-phase-detection portions include peripheral areas as well as substantially sized interior areas, such as the area around exemplary edge 1330. Thus, prior art image sensor 1350 may fail to enable autofocus on desired scene features. Comparing image sensor 100 to prior art image sensor 1350, the configuration of image sensor 100 provides superior phase-detection coverage of the full pixel array, while overcoming image artifacts attributable to phase-detection pixels by intermixing non-phase-detection pixels with phase-detection pixels in phase-detection columns 510 and phase-detection rows 520.

Figure 14:
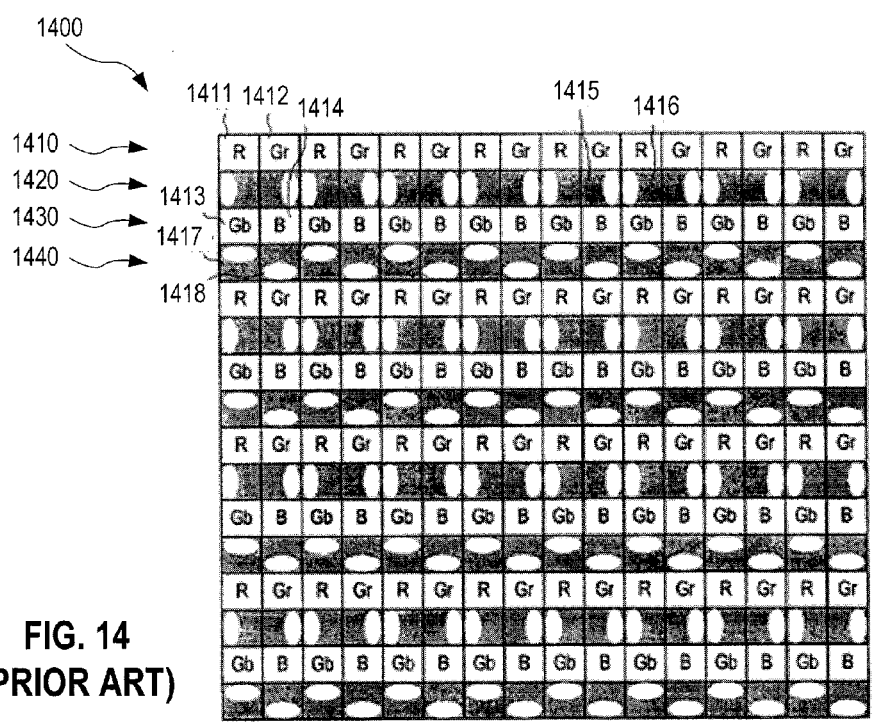
FIG. 14 illustrates a portion of prior art color image sensor with on-chip phase detection.

FIG. 14 illustrates a portion of prior art color image sensor 1400, disclosed in US 2012/0154637 A1, with on-chip phase detection. This portion of prior art color image sensor 1400 is composed of cyclically repeating (a) imaging rows 1410 having pixels 1411 and 1412 sensitive to red and green light, respectively, (b) phase-detection rows 1420 composed of pairs of phase-detection pixels 1415 and 1416, wherein each pair detects horizontal phase difference between phase-detection pixels 1415 and 1416 of the pair, (c) imaging rows 1430 composed of pixels 1413 and 1414 sensitive to green and blue light, respectively, and (d) phase-detection rows 1440 composed of pairs of phase-detection pixels 1417 and 1418, wherein each pair detects vertical phase difference between phase-detection pixels 1417 and 1418 of the pair. Every other pixel of this portion of prior art color image sensor 1400 is a phase-detection pixels. Thus, the overall light-collection efficiency of this portion of prior art color image sensor 1400 is significantly reduced by the masks of phase-detection pixels. Additionally, the image produced by this portion of prior art color image sensor 1400 is either limited to the resolution provided by imaging rows 1410 and 1430, or subject to substantial image correction. Each phase-detection pixel of this portion of prior art color image sensor 1400 has adjacent non-phase-detection pixels only above and below, and has none along the dimension parallel to rows 1410, 1420, 1430, and 1440.

In comparison, in color image sensor 1000 (FIG. 10) of the present disclosure, each phase-detection pixel is adjacent only to non-phase-detection pixels. In prior art color image sensor 1400, correction of each color pixel group (including one of each of pixels 1411, 1412, 1413, and 1414), requires correction of four phase-detection pixels 1415, 1416, 1417, and 1418. For comparison, in color image sensor 1000, correction of each color pixel group 1002 that includes a phase-detection pixel requires correction only of a single phase-detection pixel. Therefore, color image sensor 1000 is capable of generating a color image that represent a scene more accurately than a color image generated by prior art color image sensor 1400. In addition, the overall light collection efficiency of color image sensor 1000 is greater than that of prior art color image sensor 1400, which results in further improvement of the image quality provided by color image sensor 1000.

Figure 15:
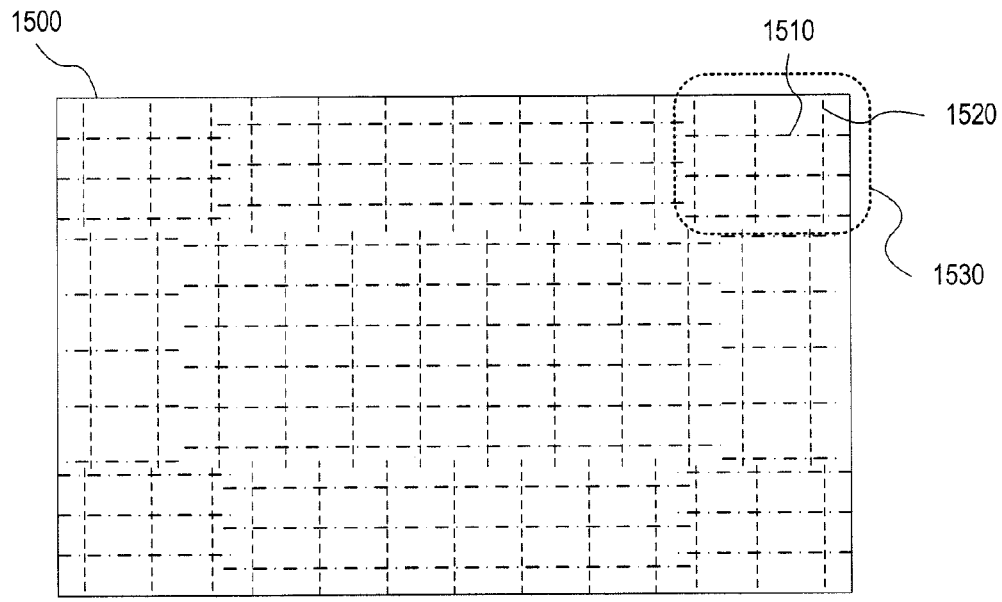
FIG. 15 illustrates another image sensor with robust on-chip phase detection, according to an embodiment.

FIG. 15 illustrates one exemplary image sensor 1500 with robust on-chip phase detection. Image sensor 1500 is similar to image sensor 100 (FIG. 1), except that the pixel array of image sensor 1500 is subdivided into a plurality of regions 1530. Each region 1530 includes one or more phase-detection columns 1510 and one or more phase-detection rows 1520. Phase-detection column 1510 and phase-detection row 1520 are embodiments of phase-detection column 510 (FIG. 5) and phase-detection row 520, respectively. Phase-detection columns 1510 and phase-detection rows 1520 of one region 1530 may or may not be aligned with phase-detection columns 1510 and phase-detection rows 1520 of another region 1530. Regions 1530 of image sensor 1500 cooperate to provide the same functionality as for image sensor 100.

Figure 16:
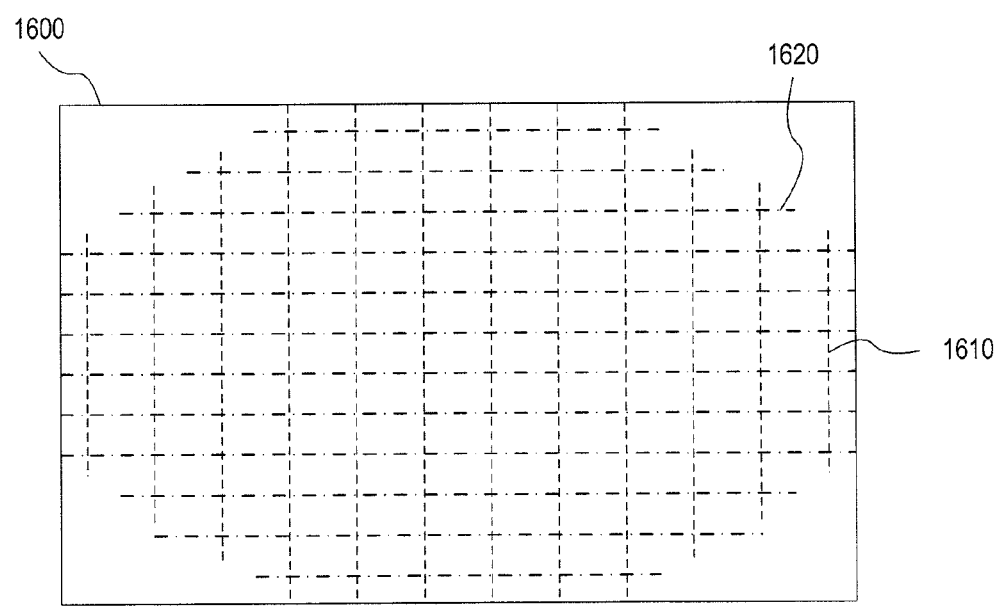
FIG. 16 illustrates an image sensor with robust on-chip phase-detection within a portion thereof, according to an embodiment.

FIG. 16 illustrates one exemplary image sensor 1600 with robust on-chip phase-detection within a portion of image sensor 1600. Image sensor 1600 includes a plurality of phase-detection columns 1610 and a plurality of phase-detection rows 1620. Each phase-detection column 1610 intersects at least one phase-detection row 1620, and each phase-detection row 1620 intersects at least one phase-detection column 1610. Phase-detection column 1610 and phase-detection row 1620 are similar to phase-detection column 510 (FIG. 5) and phase-detection row 520, respectively, except that phase-detection column and phase-detection row need not span the full extent, in a corresponding dimension, of the pixel array of image sensor 1600. The portion of image sensor 1600 covered by phase-detection columns 1610 and phase-detection rows 1620 has functionality similar to that of image sensor 100 (FIG. 1).

Figure 17:
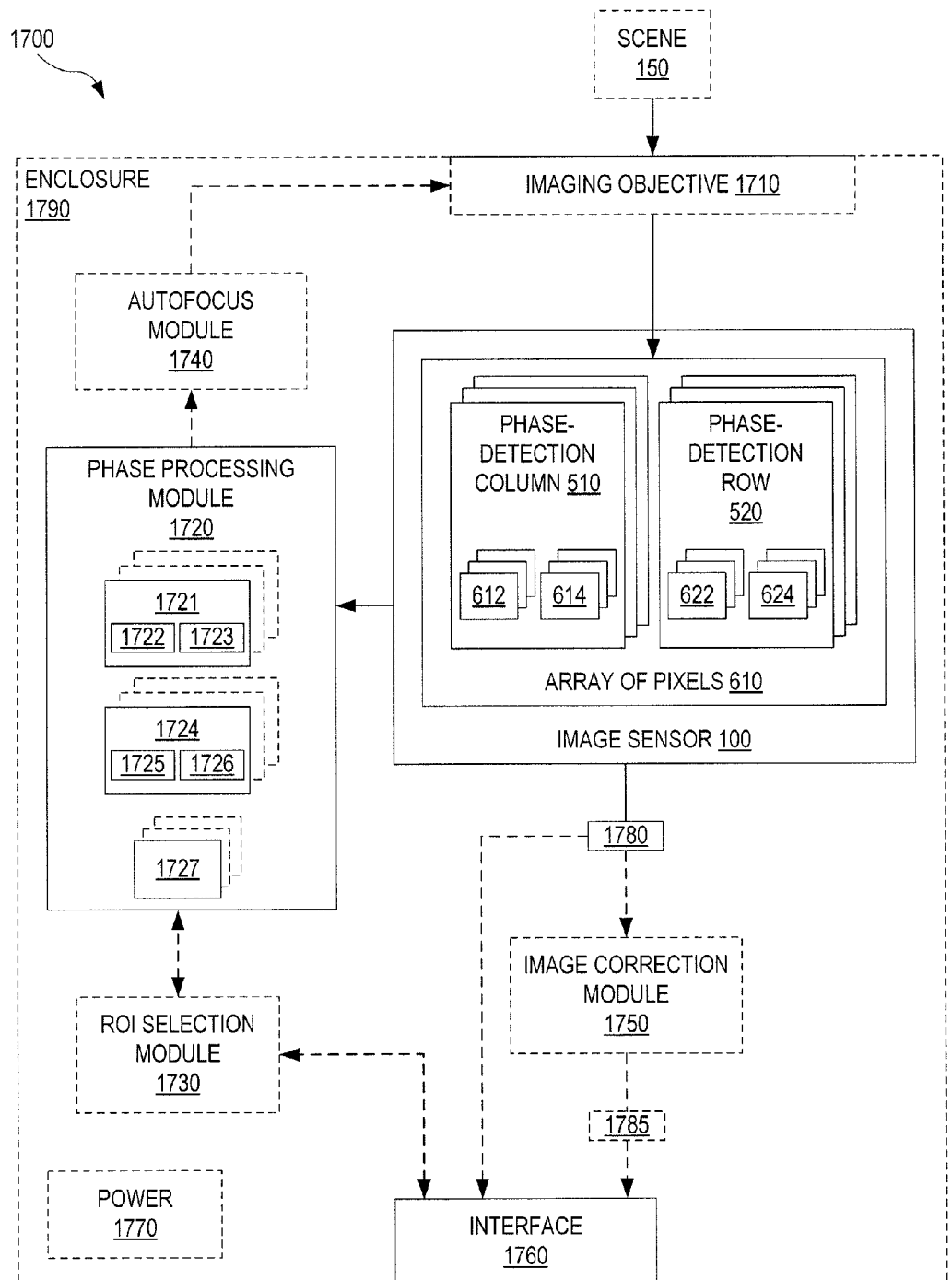
FIG. 17 illustrates an imaging system with robust on-chip phase detection, according to an embodiment.

FIG. 17 illustrates one exemplary imaging system 1700 with robust on-chip phase detection. Imaging system 1700 includes image sensor 100 (FIG. 1), a phase-processing module 1720, and an interface 1760.

Interface 1760 is an interface that handles communication between imaging system 1700 and a user and/or an external system such as a computer. Interface 1760 may include user interface devices such as a display, a touch screen, and/or a keyboard. Interface 1760 may include wired (such as Ethernet, USB, FireWire, or Thunderbolt) and/or wireless (such as Wi-Fi or Bluetooth) connections for communicating images to a user or an external system.

For each phase-detection column 510 (FIG. 5), or each one of several portions of each phase-detection column 510, considered by phase-processing module 1720, phase-processing module 1720 processes electrical signals generated by top-masked pixels 612 (FIG. 6) and bottom-masked pixels 614 to determine a vertical line profile pair 1721 consisting of a vertical line profile 1722 and a vertical line profile 1723. Phase-processing module 1720 determines vertical line profile 1722 and vertical line profile 1723 based upon electrical signals received from top-masked pixels 612 and bottom-masked pixels 614, respectively. Vertical line profiles 1722 and 1723 are similar to line profiles 1222 and 1232 (FIG. 12).

For each phase-detection row 520, or each one of several portions of each phase-detection row 520, considered by phase-processing module 1720, phase-processing module 1720 processes electrical signals generated by right-masked pixels 622 and left-masked pixels 624 to determine a horizontal line profile pair 1724 consisting of a horizontal line profile 1725 and a horizontal line profile 1726. Phase-processing module 1720 determines horizontal line profile 1725 and horizontal line profile 1726 based upon electrical signals received from right-masked pixels 622 and left-masked pixels 624, respectively. Horizontal line profiles 1725 and 1726 are similar to line profiles 1224 and 1234.

Based upon vertical line profile pair 1721 and horizontal line profile pair 1724, phase-processing module 1720 detects an edge (such as edge 1260) in an image formed on the array of pixels 610 and determines an associated phase shifts 1727. The edge, thus detected by phase-processing module 1720, may have arbitrary orientation relative to the array of pixels 610.

Although image sensor 100 is shown in FIG. 17 as having three of each of phase-detection columns 510, phase-detection rows 520, top-masked pixels 612, bottom-masked pixels 614, right-masked pixels 622, and left-masked pixels 624, actual numbers may be different, without departing from the scope hereof.

In an embodiment, imaging system 1700 includes an autofocus module 1740 and an imaging objective 1710. Autofocus module 1740 adjusts imaging objective 1710 based upon phase shifts 1727 received from phase-processing module 1720.

Image sensor 100 captures image 1780 of a scene 150. Image sensor 100 may output image 1780 directly to interface 1760. In an embodiment, imaging system includes an image correction module 1750 that corrects image 1780 for contribution from top-masked pixels 612, bottom-masked pixels 614, right-masked pixels 622, and left-masked pixels 624, for example as discussed above in reference to FIGS. 5, 6, 9, and 10. Image correction module 1750 thereby produces a corrected image 1785 and outputs corrected image 1785 to interface 1760. Corrected image is, for example, focused image 120 (FIG. 1).

In an embodiment, imaging system 1700 includes a ROI selection module 1730 that selects an ROI, within the array of pixels 610, to be processed by phase-processing module 1720. ROI selection module 1730 may receive ROI specification from interface 1760. Alternatively, or in combination therewith, ROI selection module 1730 receives, from phase-processing module 1720, locations of edge(s) with respect to the array of pixels 610 and, based thereupon, determines an ROI specification.

Imaging system 1700 may further include an enclosure 1790 and/or a power supply 1770.

Figure 18:
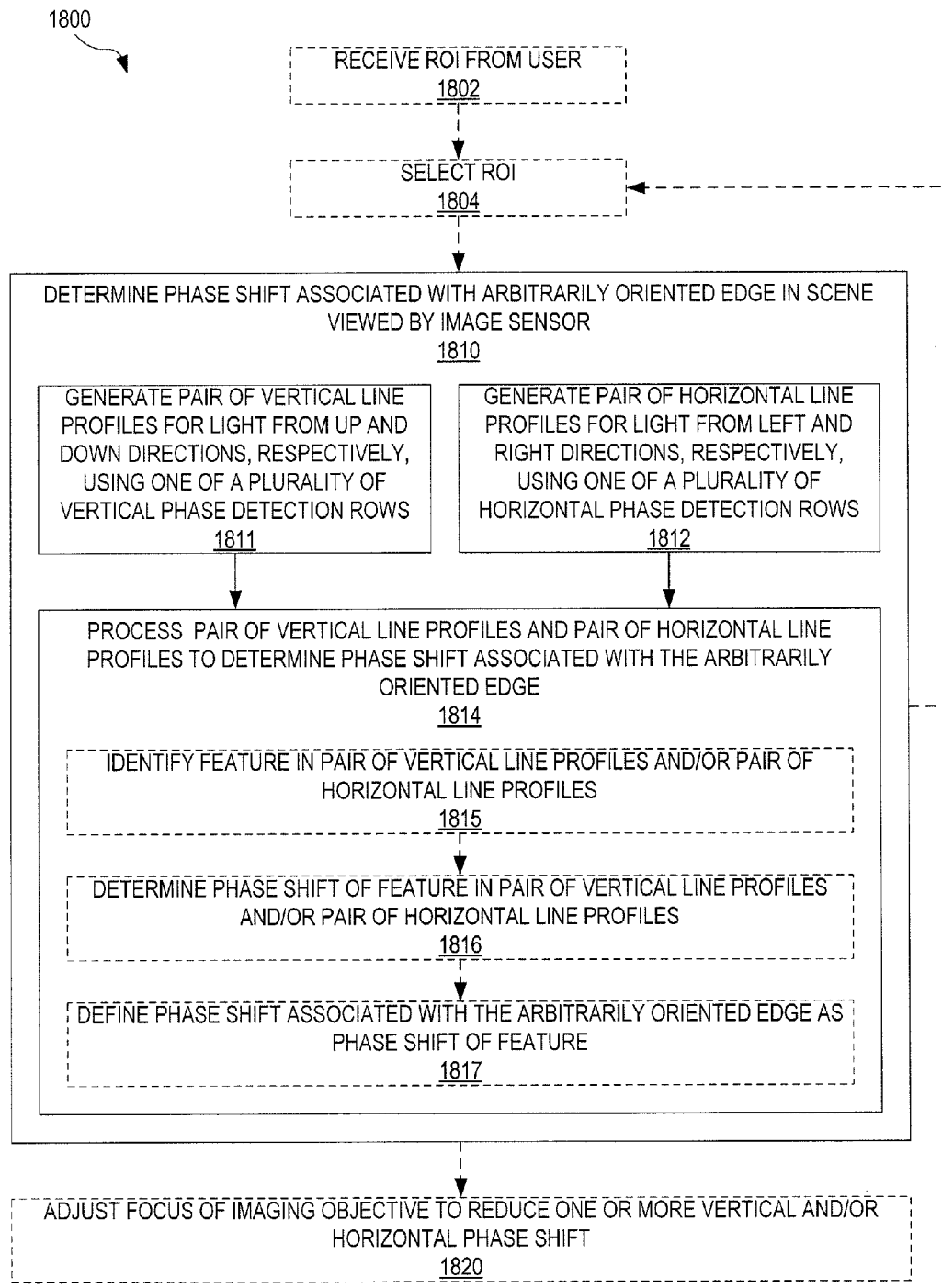
FIG. 18 illustrates a method for robust on-chip phase detection utilizing the image sensor of FIG. 1 as implemented in the imaging system of FIG. 17, according to an embodiment.

FIG. 18 illustrates one exemplary method 1800 for robust on-chip phase detection utilizing image sensor 100 (FIG. 1) as implemented in imaging system 1700 (FIG. 17). Optionally, method 1800 includes adjusting focus of imaging objective 1710, for example to autofocus imaging system 1700.

In a step 1810, phase-processing module 1720 uses image sensor 100 to determine a phase shift associated with an arbitrarily oriented edge in scene 150. Phase-processing module 1720 performs step 1810 using an ROI of the array of pixels 610. This ROI may include the full array of pixels 610 or a portion thereof. In one example, the ROI is composed of several non-contiguous ROIs. Exemplary ROIs are shown in FIG. 8.

Step 1810 includes steps 1811, 1812, and 1814. In step 1811, phase-processing module 1720 generates vertical line profile pair 1721 for each of phase-detection columns 510, or portion(s) thereof, within the considered ROI. In step 1812, phase-processing module 1720 generates horizontal line profile pair 1724 for each of phase-detection rows 520, or portion(s) thereof, within the considered ROI. In step 1814, phase-detection module 1720 processes each vertical line profile pair 1721 and horizontal line profile pair 1724, generated in steps 1811 and 1812, to determine a phase shift 1727 associated with an arbitrarily oriented edge in scene 150 imaged onto the considered ROI of the array of pixels 610. Without departing from the scope hereof, phase-processing module 1720 may perform step 1814 to determine a plurality of phase shifts associated with a plurality of edges in scene 150.

In an embodiment, step 1814 includes steps 1815, 1816, and 1817. In step 1815, phase-processing module 1720 identifies a feature in at least one of the vertical line profile pairs 1721 and horizontal line profiles pairs 1724 generated in steps 1811 and 1812. The feature is, for example, a change in brightness and/or color measurement 1290 (FIG. 12). In step 1816, phase-processing module 1720 determines a phase shift of the feature, for example similar to phase shift 1202 and/or 1204. If different vertical line profile pairs 1721 and horizontal line profiles pairs 1724 result in different feature phase shifts, phase-processing module 1720 may define the phase shift as one of such different phase shifts or an average thereof. In step 1817, phase-processing module 1720 defines phase shift 1727 associated with the arbitrarily oriented edge as the phase shift determined in step 1816.

In certain embodiments, method 1800 includes a step 1804, wherein ROI selection module 1730 selects the ROI. In one example of such embodiments, method 1800 further includes a step 1802, wherein ROI selection module 1730 receives specification of the ROI from interface 1760. In another example, ROI selection module 1730 selects the ROI based upon data generated by phase-processing module 1720 in step 1810. In this example, phase-processing module 1720 may perform step 1810 to detect one or more edges in an image formed on the array of pixels 610, whereafter ROI selection module 1730 selects an ROI that includes one or more of such edges.

In an embodiment, method 1800 includes a step 1820, wherein autofocus module 1740 adjusts focus of imaging objective 1710 based upon phase shift 1727 determined in step 1810. Method 1800 may include one or more iterations of steps 1810 and 1820 such that autofocus module 1740 may autofocus imaging system 1700.

Figure 19:
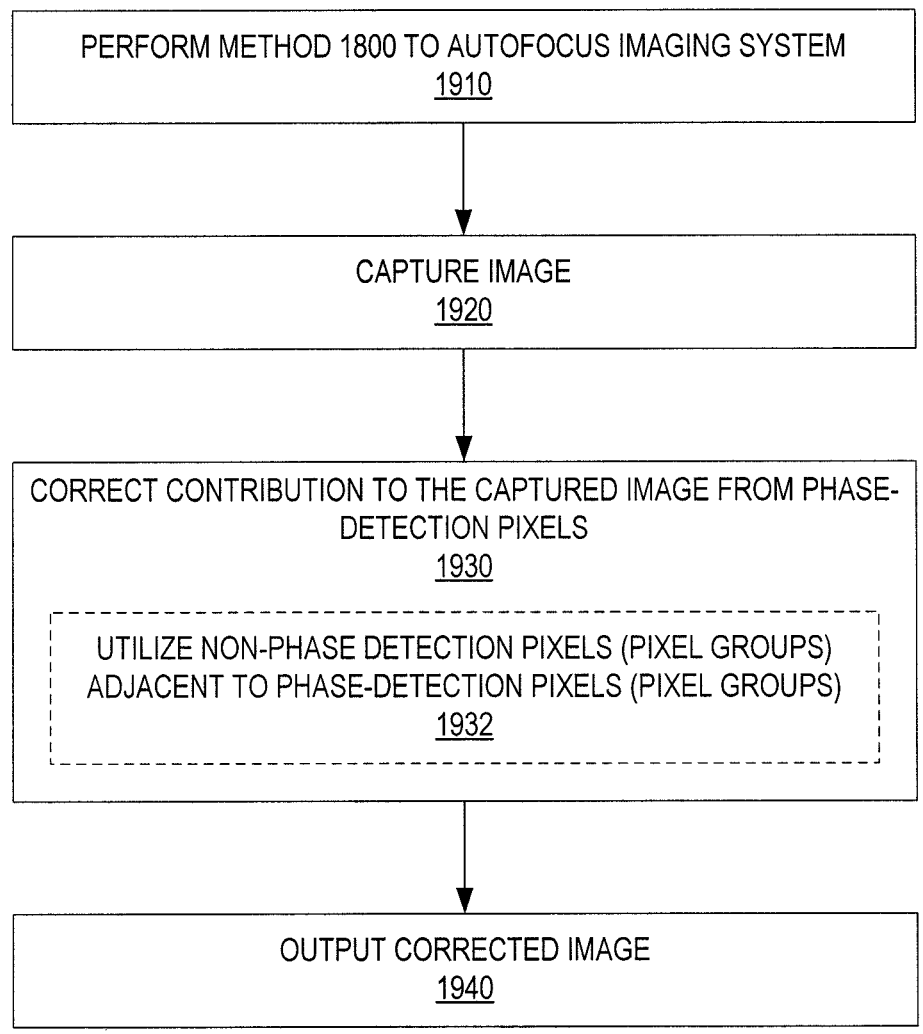
FIG. 19 illustrates a method for image capture using the imaging system of FIG. 17, according to an embodiment.

FIG. 19 illustrates one exemplary method 1900 for image capture using imaging system 1700 (FIG. 17). In a step 1910, imaging system 1700 performs method 1800 (FIG. 18) to autofocus imaging system 1700. In a step 1920, image sensor 100 captures image 1780. In a step 1930, image correction module 1750 corrects contribution to image 1780 from phase-detection pixels, top-masked pixels 612, bottom-masked pixels 614, right-masked pixels 622, and left-masked pixels 624, to produce corrected image 1785. For each phase-detection pixel, image correction module 1750 corrects the contribution of this phase-detection pixel to image 1780 based upon adjacent non-phase-detection pixels as discussed in reference to FIGS. 5, 6, 9, and 10. Without departing from the scope hereof, image correction module 1750 may, for one or more of the phase-detection pixels, also utilize non-phase-detection pixels further away than the adjacent non-phase-detection pixels. In a step 1940, imaging system 1700 outputs corrected image 1785 via interface 1760.

Figure 20:
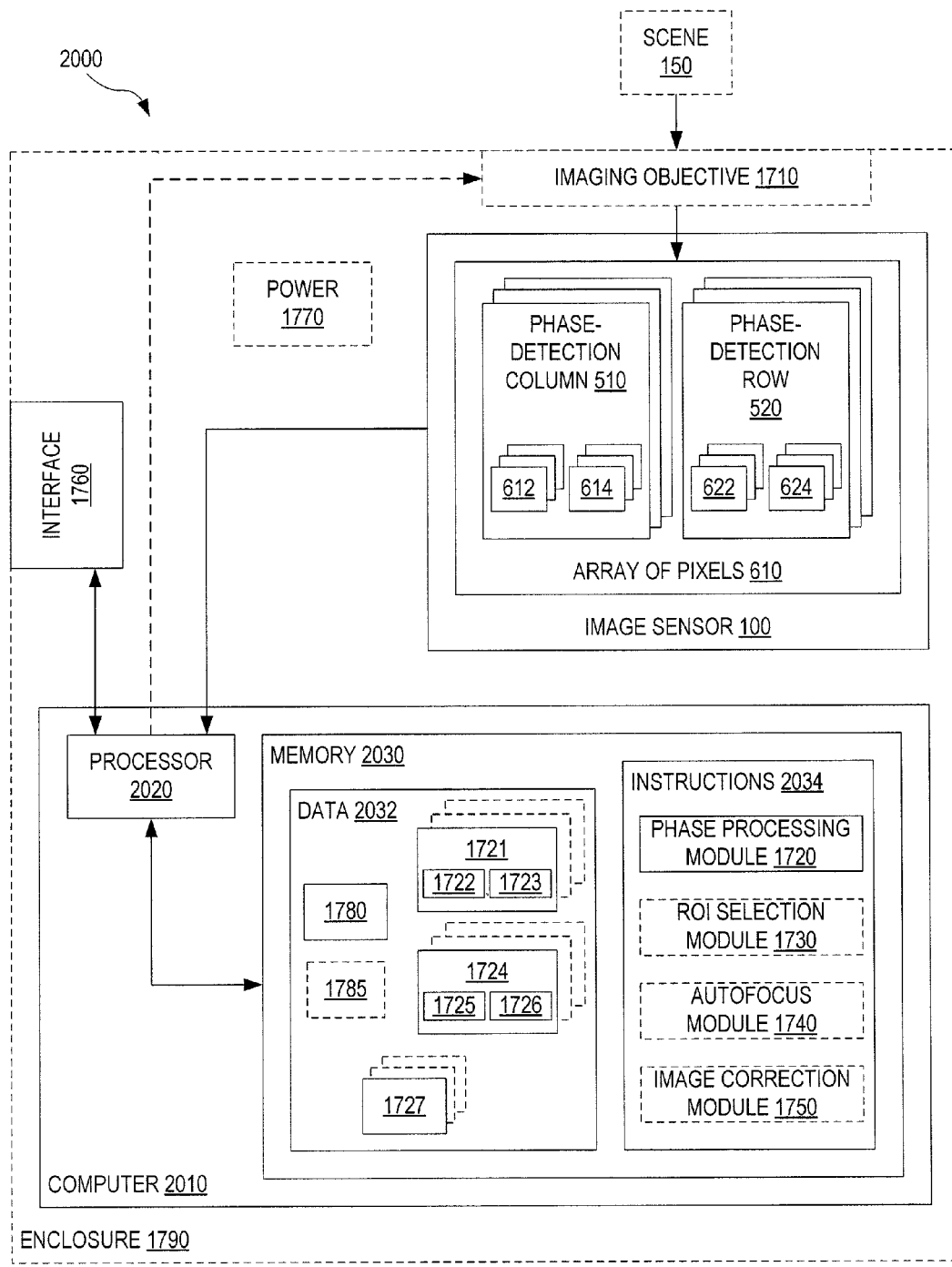
FIG. 20 illustrates another imaging system with robust on-chip phase detection, according to an embodiment.

FIG. 20 illustrates one exemplary imaging system 2000 with robust on-chip phase detection. Imaging system 2000 is an embodiment of imaging system 1700, wherein phase-detection module 1720, and optionally one or more of ROI selection module 1730, autofocus module 1740, and image correction module 1750, are implemented in a computer 2010. Imaging system 2000 is, for example, implemented in a camera phone or a compact digital camera.

Computer 2010 includes a processor 2020 and a memory 2030. Processor 2020 is communicatively coupled with memory 2030, image sensor 100, interface 1760, and optionally imaging objective 1710. Memory 2030 is, for example, of type ROM, Flash, magnetic tape, magnetic drive, optical drive, RAM, other non-transitory medium, or combinations thereof. Memory 2030 includes a data storage 2032 and machine-readable instructions 2034 encoded in a non-transitory portion of memory 2030. Data storage 2032 stores vertical line profile pair(s) 1721, horizontal line profile pair(s) 1724, phase shift(s) 1727, image 1780, and optionally corrected image 1785. Computer 2010 implements phase-detection module 1720 as machine-readable instructions, within machine-readable instructions 2034, executable by processor 2020. Additionally, computer 2010 may implement one or more of ROI selection module 1730, autofocus module 1740, and image correction module 1750 as machine-readable instructions, within machine-readable instructions 2034, executable by processor 2020.

FIGS. 21A, 21B, 22A, 22B, 23A, and 23B show exemplary phase-detection data generated by one exemplary embodiment of imaging system 1700 (FIG. 17). In this example, scene 150 includes an object 2160 of interest (a thick black line on a piece of paper), an object 2170 (a color card) more distant from imaging system 1700 than object 2160, and an object 2180 (another color card) less distant from imaging system 1700 than object 2160.

Figure 21A:
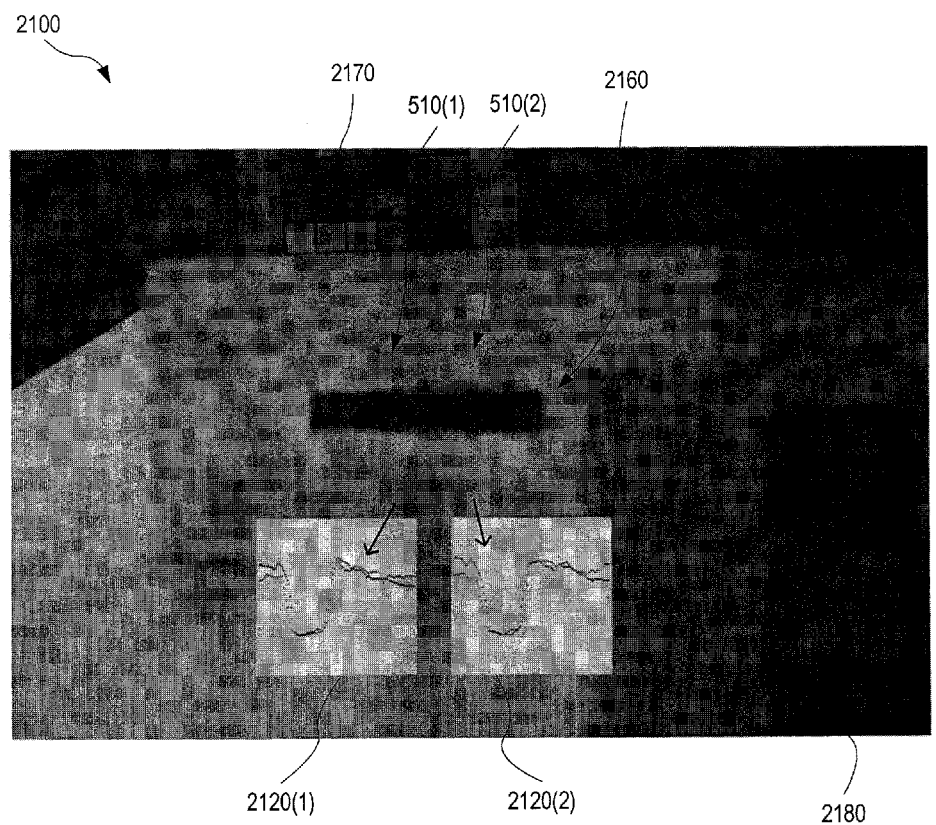
FIGS. 21A and 21B show exemplary phase-detection data generated by the imaging system of FIG. 17, according to an embodiment, for a scenario wherein an object of interest is less distant than being in focus of the imaging system.
Figure 21B:
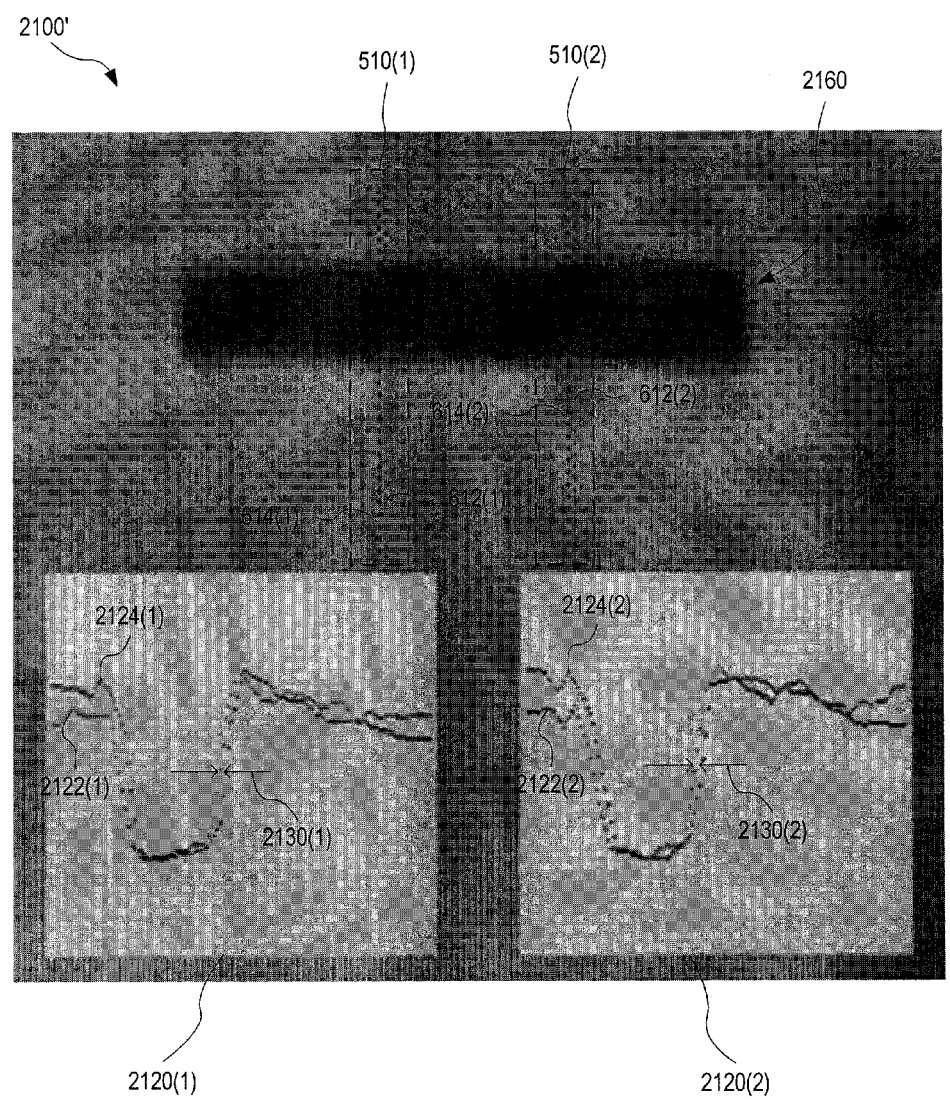
Figure 22A:
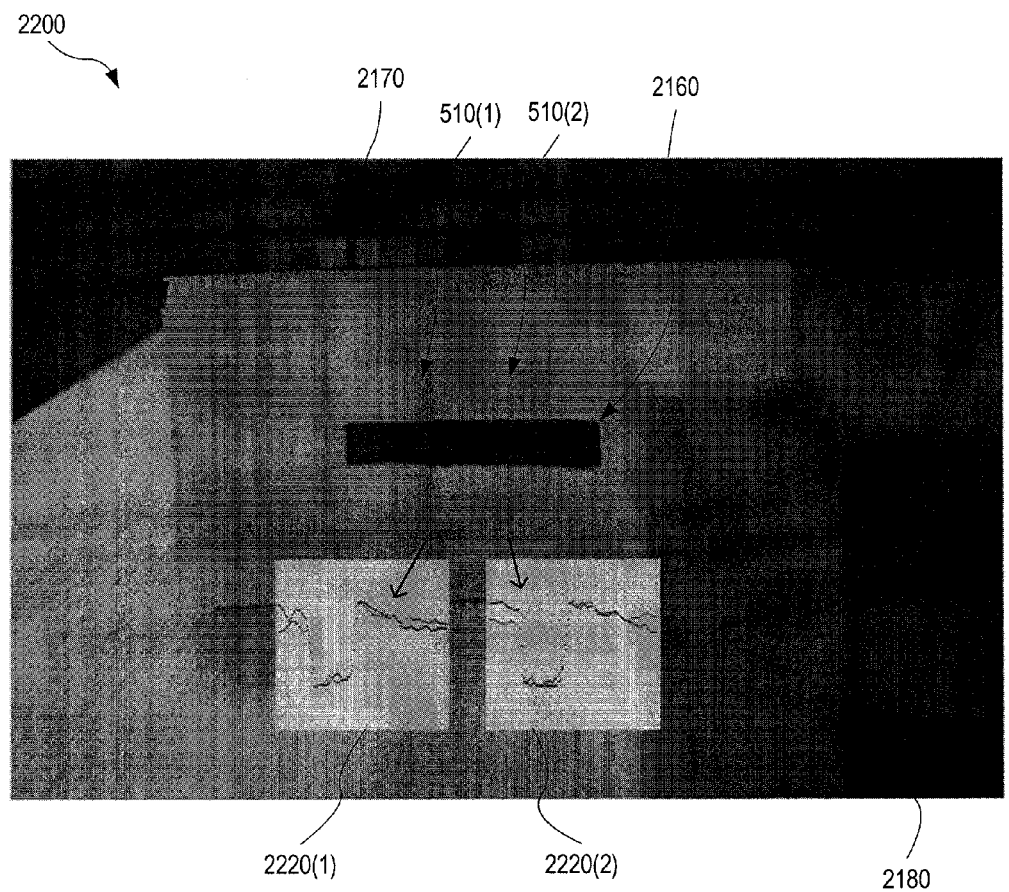
FIGS. 22A and 22B show exemplary phase-detection data generated by the imaging system of FIG. 17, according to an embodiment, for a scenario wherein an object of interest is in focus of the imaging system.
Figure 22B:
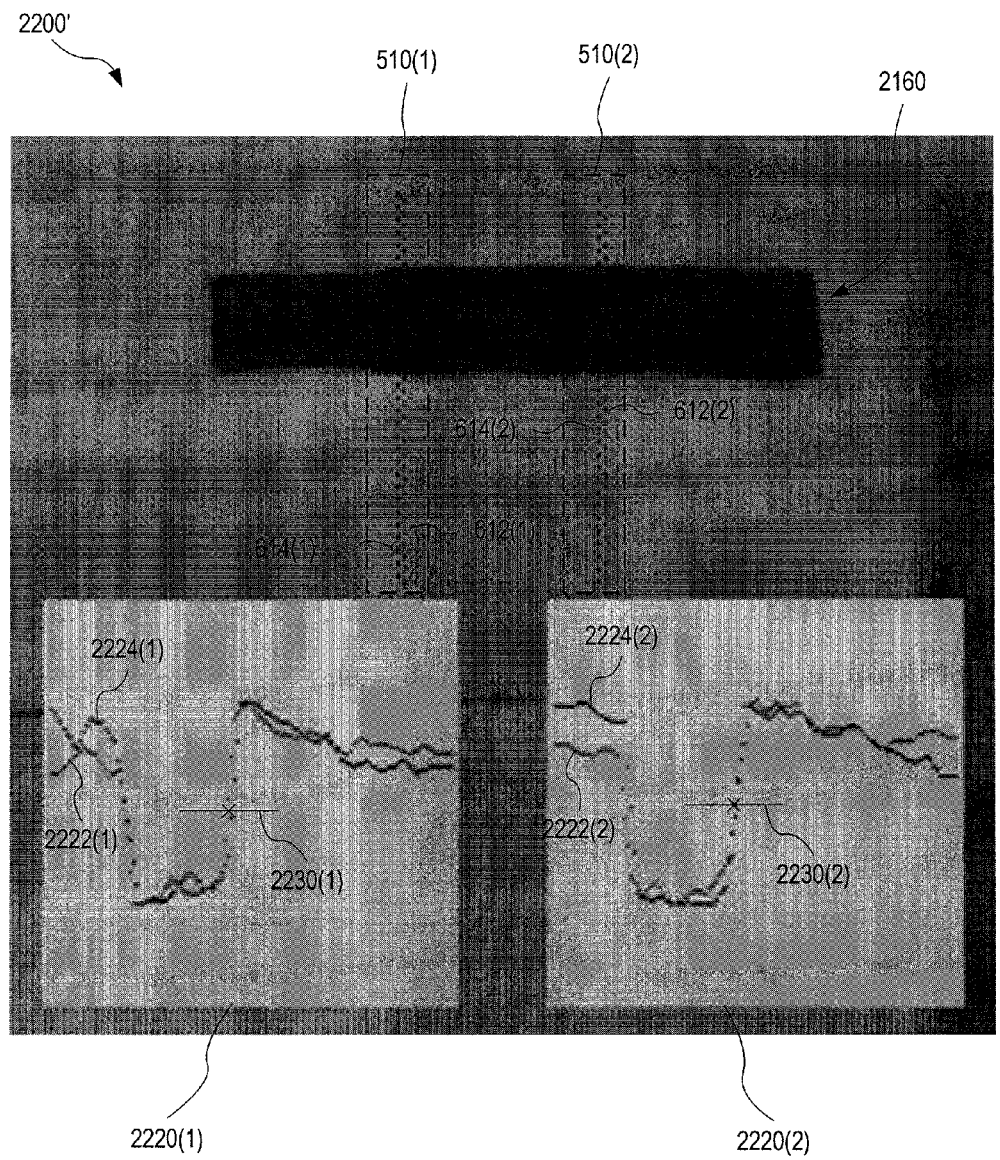
Figure 23A:
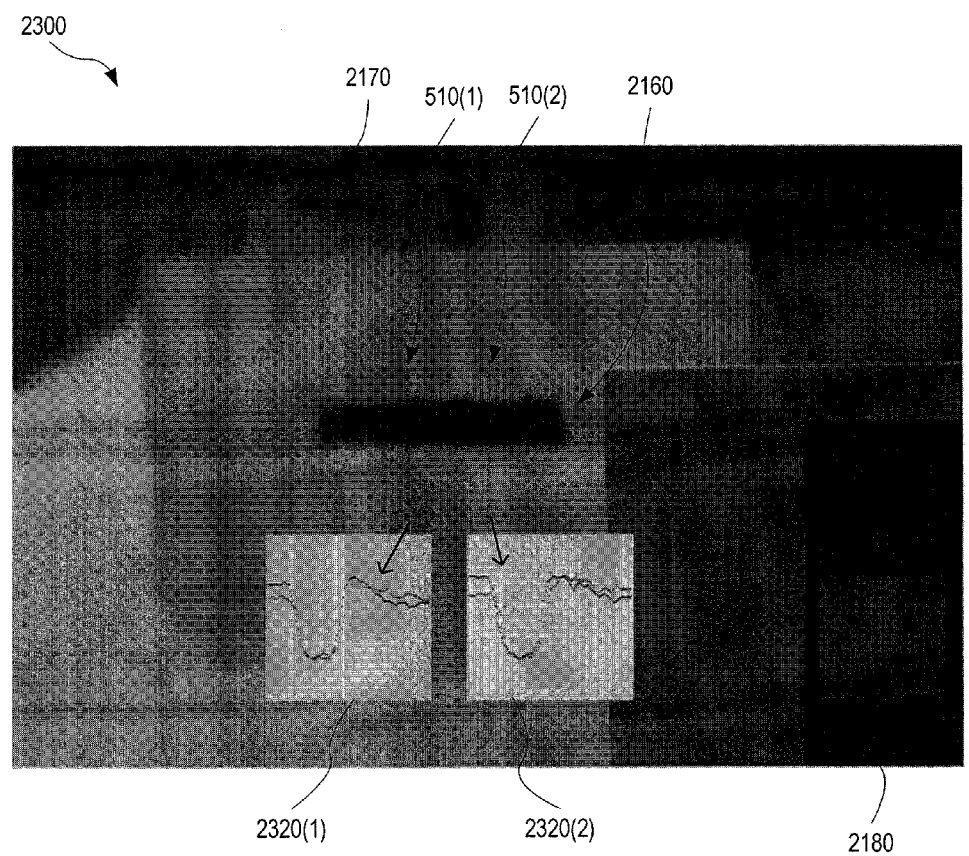
FIGS. 23A and 23B show exemplary phase-detection data generated by the imaging system of FIG. 17, according to an embodiment, for a scenario wherein an object of interest is more distant than being in focus of the imaging system.
Figure 23B:
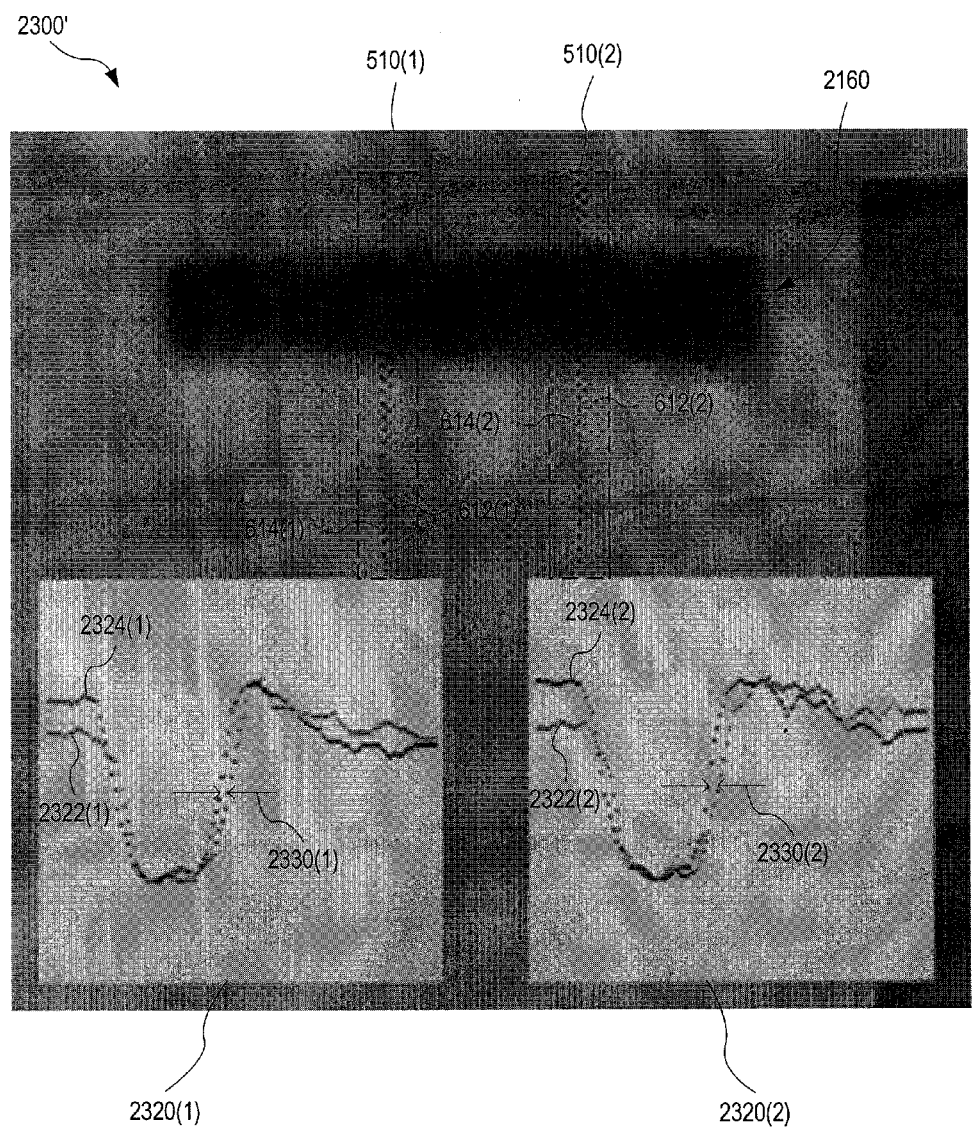

FIGS. 21A and 21B show an image 2100 captured by image sensor 100, wherein imaging system 1700 is focused on object 2170 such that object 2160 is too close to be in focus. FIGS. 22A and 22B show an image 2200 captured by image sensor 100, wherein imaging system 1700 is focused on object 2160. FIGS. 23A and 23B show an image 2300 captured by image sensor 100, wherein imaging system 1700 is focused on object 2180 such that object 2160 is too distant to be in focus. FIGS. 21A, 21B, 22A, 22B, 23A, and 23B are best viewed together. Apart from focus conditions, images 2100, 2200, and 2300 represent the same scene 150. Overlaid on images 2100, 2200, and 2300 are indications of portions of two phase-detection columns 510(1) and 510(2) (FIG. 5) overlapping with object 2160. Also indicated are top-masked pixels 612(1,2) and bottom-masked pixels 614(1,2) of phase-detection columns 510(1,2). For clarity of illustration, not all top-masked pixels 612 and bottom-masked pixels 614 are labeled in FIGS. 21B, 22B, and 23B, and no top-masked pixels 612 and bottom-masked pixels are labeled in FIGS. 21A, 22A, and 23A.

Referring now to FIGS. 21A and 21B, FIG. 21A shows image 2100 of the full scene 150, while FIG. 21B shows a portion 2100' of image 2100 associated with object 2160. Overlaid on image 2100 are vertical line profile pairs 2120(1) and 2120(2) for each of phase-detection columns 510(1) and 510(2). Vertical line profile pairs 2120(1) and 2120(2) are examples of vertical line profile pair 1721. Vertical line profile pair 2120(1) includes line profiles 2122

(1) and 2124(1) generated from top-masked pixels 612(1) and bottom-masked pixels 614(1), respectively. Similarly, vertical line profile pair 2120(2) includes line profiles 2122(2) and 2124(2) generated from top-masked pixels 612(2) and bottom-masked pixels 614(2), respectively. Line profiles 2122(1,2) and 2124(1,2) are examples of vertical line profiles 1722 and 1723. Because object 2160 is misfocused in image 2100, a phase shift 2130(1) exists between line profiles 2122(1) and 2124(1), and a phase shift 2130(2) exists between line profiles 2122(2) and 2124(2). Phase shifts 2130(1) and 2130(2) are associated with two respective edges of object 2160.

Referring now to FIGS. 22A and 22B, FIG. 22A shows image 2200 of the full scene 150, while FIG. 22B shows a portion 2200' of image 2200 associated with object 2160. Overlaid on image 2200 are vertical line profile pairs 2220(1) and 2220(2) for each of phase-detection columns 510(1) and 510(2). Vertical line profile pairs 2220(1) and 2220(2) are examples of vertical line profile pair 1721. Vertical line profile pair 2220(1) includes line profiles 2222(1) and 2224(1) generated from top-masked pixels 612(1) and bottom-masked pixels 614(1), respectively. Similarly, vertical line profile pair 2220(2) includes line profiles 2222(2) and 2224(2) generated from top-masked pixels 612(2) and bottom-masked pixels 614(2), respectively. Line profiles 2222(1,2) and 2224(1,2) are examples of vertical line profiles 1722 and 1723. Because object 2160 is focused in image 2100, phase shift 2230(1) between line profiles 2222(1) and 2224(1) is zero, and a phase shift 2230(1) between line profiles 2122(2) and 2124(2) is zero. The features of line profiles 2222(1), 2224(1), 2122(2), and 2124(2), allowing determination of the zero phase shifts 2230(1) and 2230(1), are associated with two edges of object 2160.

Referring now to FIGS. 23A and 23B, FIG. 23A shows image 2300 of the full scene 150, while FIG. 23B shows a portion 2300' of image 2300 associated with object 2160. Overlaid on image 2300 are vertical line profile pairs 2320(1) and 2320(2) for each of phase-detection columns 510(1) and 510(2). Vertical line profile pairs 2320(1) and 2320(2) are examples of vertical line profile pair 1721. Vertical line profile pair 2320(1) includes line profiles 2322(1) and 2324(1) generated from top-masked pixels 612(1) and bottom-masked pixels 614(1), respectively. Similarly, vertical line profile pair 2320(2) includes line profiles 2322(2) and 2324(2) generated from top-masked pixels 612(2) and bottom-masked pixels 614(2), respectively. Line profiles 2322(1,2) and 2324(1,2) are examples of vertical line profiles 1722 and 1723. Because object 2160 is misfocused in image 2300, a phase shift 2330(1) exists between line profiles 2322(1) and 2324(1), and a phase shift 2330(2) exists between line profiles 2322(2) and 2324(2). In absolute terms, the sign of phase shifts 2330(1) and 2330(2) is opposite the sign of phase shifts 2130(1) and 2130(2). Phase shifts 2330(1) and 2330(2) are associated with two respective edges of object 2160.

Combinations of Features

Features described above as well as those claimed below may be combined in various ways without departing from the scope hereof. For example, it will be appreciated that aspects of one image sensor for robust on-chip phase detection, or associated system or method, described herein may incorporate or swap features of another image sensor for robust on-chip phase detection, or associated system or method, described herein. The following examples illustrate some possible, non-limiting combinations of embodiments described above. It should be clear that many other changes and modifications may be made to the image sensors, systems, and methods herein without departing from the spirit and scope of this invention:

(A1) An image sensor for on-chip phase detection may include a pixel array for capturing an image of a scene, the pixel array including (a) a plurality of horizontal phase-detection rows, each having a first plurality of phase-detection pixels for detecting horizontal change in the scene, and (b) a plurality of vertical phase-detection columns, each having a second plurality of phase-detection pixels for detecting vertical change in the scene.

(A2) In the image sensor denoted as (A1), each of the plurality of horizontal phase-detection rows may intersect each of the plurality of vertical phase-detection columns.

(A3) In each of the image sensors denoted as (A1) and (A2), the first plurality of phase-detection pixels, for each of the horizontal phase-detection rows, may include a plurality of left-masked pixels and a plurality of right-masked pixels, for detecting the horizontal change; and the second plurality of phase-detection pixels, for each of the vertical phase-detection columns, may include a plurality of top-masked pixels and a plurality of bottom-masked pixels, for detecting the vertical change.

(A4) In the image sensor denoted as (A3), the left-masked pixels and the right-masked pixels, of each of the horizontal phase-detection rows, may be arranged in a horizontally oriented series of phase-detection pixel pairs, wherein each phase-detection pixel pair includes one of the left-masked pixels and one of the right-masked pixels; and the top-masked pixels and the bottom-masked pixels, of each of the vertical phase-detection columns, may be arranged in a vertically oriented series of phase-detection pixel pairs, wherein each phase-detection pixel pair includes one of the top-masked pixels and one of the bottom-masked pixels.

(A5) In each of the image sensors denoted as (A3) and (A4), within each of the horizontal phase-detection rows, the left-masked pixels may be vertically offset from the right-masked pixels; and, within each of the vertical phase-detection columns, the top-masked pixels may be horizontally offset from the bottom-masked pixels.

(A6) In each of the image sensors denoted as (A1) through (A5), each of the phase-detection pixels may be adjacent only to pixels, of the pixel array, that are not phase-detection pixels.

(A7) In each of the image sensors denoted as (A1) through (A6), the pixel array may be composed of a plurality of color pixel groups for generating a color image of the scene.

(A8) In the image sensor denoted as (A7), each color pixel group may have a plurality of types of color-sensitive pixels sensitive to a respective plurality of colors, and all of the phase-detection pixels may be of same one of the plurality of types.

(A9) In each of the image sensors denoted as (A7) and (A8), the plurality of color pixel groups may include (a) a plurality of phase-detection color pixel groups, each having at most one of the phase-detection pixels, and (b) a plurality of non-phase-detection color pixel groups having no phase-detection pixels.

(A10) In the image sensor denoted as (A9), each of the phase-detection color pixel groups may be adjacent to at most two other ones of the phase-detection color pixel groups.

(A11) In each of the image sensors denoted as (A1) through (A10), each of the horizontal phase-detection rows may substantially span horizontal extent of the pixel array; and each of the vertical phase-detection columns may substantially span vertical extent of the pixel array.

(A12) In each of the image sensors denoted as (A1) through (A11), the plurality of horizontal phase-detection rows may include at least ten phase-detection rows, and the plurality of vertical phase-detection columns may include at least ten phase-detection columns.

(B1) A phase-detection method, using an image sensor with on-chip phase-detection pixels, may include (a) generating a pair of horizontal line profiles for light from left and right directions, respectively, using one of a plurality of horizontal phase-detection rows of the image sensor, (b) generating a pair of vertical line profiles for light from up and down directions, respectively, using one of a plurality of vertical phase-detection columns of the image sensor, the one of a plurality of vertical phase-detection columns intersecting the one of a plurality of horizontal phase-detection rows, and (c) determining phase shift associated with at least one arbitrarily oriented edge in a scene viewed by the image sensor, based upon the pair of horizontal line profiles and the pair of vertical line profiles.

(B2) The method denoted as (B1) may further include adjusting focus of an imaging objective to reduce the phase shift.

(B3) Each of the methods denoted as (B1) and (B2) may further include capturing an image of the scene using the image sensor.

(B4) In each of the methods denoted as (B1) through (B3), the step of generating a pair of horizontal line profiles may include using a first portion of a plurality of phase-detection pixels associated with the plurality of horizontal phase-detection rows, and the steep of generating a pair of vertical line profiles may include using a second portion of a plurality of phase-detection pixels associated with the plurality of vertical phase-detection columns.

(B5) The method denoted as (B4) may further include correcting contribution to the image, from each of the phase-detection pixels associated with the plurality of horizontal phase-detection rows and each of the phase-detection pixels associated with the plurality of vertical phase-detection columns, based upon respectively adjacent non-phase-detection pixels of corresponding color-sensitivity.

(B6) In each of the methods denoted as (B1) through (B5), the step of generating a pair of horizontal line profiles may include generating (a) a line profile produced by a plurality of left-masked pixels and (b) a line profile produced by a plurality of right-masked pixels, and the step of generating a pair of vertical line profiles may include generating (a) a line profile produced by a plurality of top-masked pixels and (b) a line profile produced by a plurality of bottom-masked pixels.

(B7) In the method denoted as (B6), in the step of generating a pair of horizontal line profiles, the left-masked pixels may be arranged in a first horizontal pixel row, and the right-masked pixels may be arranged in a second horizontal pixel row; and, in the step of generating a pair of vertical line profiles, the top-masked pixels may be arranged in a first vertical pixel column, and the bottom-masked pixels may be arranged in a second vertical pixel column.

(B8) In each of the methods denoted as (B1) through (B7), the step of determining phase shift may include identifying a feature, associated with the arbitrarily oriented edge, in at least one of (a) the pair of horizontal line profiles and (b) the pair of vertical line profiles.

(B9) In the method denoted as (B8), the step of determining phase shift may further include evaluating, for at least one of (a) the pair of horizontal line profiles and (b) the pair of vertical line profiles, phase shift of the feature.

(B10) In the method denoted as (B9), the step of determining phase shift may further include defining the phase shift of the arbitrarily oriented edge as the value of the phase shift of the feature.

(B11) Each of the methods denoted as (B1) through (B10) may further include selecting a region of interest having arbitrary location and being associated with the arbitrarily oriented edge.

(B12) In the method denoted as (B11), the region of interest may have extent sufficient to include (a) at least one portion of at least one of the plurality of horizontal phase-detection rows and (b) at least one portion of at least one of the plurality vertical columns of phase-detection pixels.

(B13) In the method denoted as (B12), the step of generating a pair of horizontal line profiles may include generating the pair of horizontal line profiles for each of the at least one portion of each of the at least one of the plurality of horizontal phase-detection rows, and the step of generating a pair of vertical line profiles may include generating the pair of vertical line profiles for each of the at least one portion of each of the at least one of the plurality of vertical phase-detection columns.

(B14) In the method denoted as (B13), the step of determining phase shift may include determining the phase shift based upon one or more pairs of line profiles measured in the step of measuring a pair of horizontal line profiles and the step of measuring a pair of vertical line profiles.

(C1) An imaging system with on-chip phase-detection may include an image sensor with a pixel array for capturing an image of a scene, wherein the pixel array includes intersecting (a) horizontal phase-detection rows for measuring at least one pair of horizontal line profiles for light incident from left and right directions, respectively, and (b) vertical phase-detection columns for measuring at least one pair of vertical line profiles for light incident from up and down directions, respectively.

(C2) The imaging system denoted as (C1) may further include a phase-processing module for processing the at least one pair of horizontal line profiles and the at least one pair of vertical line profiles to measure phase shift associated with an arbitrarily oriented and arbitrarily located edge in the scene.

(C3) The imaging system denoted as (C2) may further include a region-of-interest selection module for selecting at least one of the horizontal phase-detection rows and at least one of the vertical phase-detection columns for processing by the phase-processing module to measure the phase shift.

(C4) Each of the imaging systems denoted as (C2) and (C3) may further include an autofocus module for adjusting focus of an imaging objective to reduce the phase shift.

(C5) In each of the imaging systems denoted as (C1) through (C4), each of the horizontal phase-detection rows may include a first plurality of partially masked pixels, wherein each of the first plurality of partially masked pixels detects light from one of the left and right directions; and each of the vertical phase-detection columns may include a second plurality of partially masked pixels, wherein each of the second plurality of partially masked pixels detects light from one of the up and down directions.

(C6) The imaging system denoted as (C5) may further include an image correction module for correcting contribution to the image from each of the partially masked phase-detection pixels based upon adjacent non-phase-detection pixels of the pixel array.

(C7) In each of the imaging systems denoted as (C1) through (C6), the image sensor may be any one of the image sensors denoted as (A1) through (A12).

Changes may be made in the above devices, systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present system and method, which, as a matter of language, might be said to fall therebetween.

What is claimed is:

1. An image sensor for on-chip phase detection, comprising:
   a pixel array for capturing an image of a scene, the pixel array including:
      a plurality of horizontal phase-detection rows, each including a first plurality of phase-detection pixels, comprising a plurality of left-masked pixels and a plurality of right-masked pixels, for detecting horizontal change in the scene, and
      a plurality of vertical phase-detection columns, each including a second plurality of phase-detection pixels, comprising a plurality of top-masked pixels and a plurality of bottom-masked pixels, for detecting vertical change in the scene;
   wherein each of the plurality of horizontal phase-detection rows intersects each of the plurality of vertical phase-detection columns.

2. The image sensor of claim 1,
   the left-masked pixels and the right-masked pixels, of each of the horizontal phase-detection rows, being arranged in a horizontally oriented series of phase-detection pixel pairs, each phase-detection pixel pair including one of the left-masked pixels and one of the right-masked pixels; and
   the top-masked pixels and the bottom-masked pixels, of each of the vertical phase-detection columns, being arranged in a vertically oriented series of phase-detection pixel pairs, each phase-detection pixel pair including one of the top-masked pixels and one of the bottom-masked pixels.

3. The image sensor of claim 2,
   within each of the horizontal phase-detection rows, the left-masked pixels being vertically offset from the right-masked pixels; and
   within each of the vertical phase-detection columns, the top-masked pixels being horizontally offset from the bottom-masked pixels.

4. The image sensor of claim 1, each of the phase-detection pixels being adjacent only to pixels, of the pixel array, that are not phase-detection pixels.

5. The image sensor of claim 1,
   each of the horizontal phase-detection rows spanning horizontal extent of the pixel array; and
   each of the vertical phase-detection columns spanning vertical extent of the pixel array.

6. The image sensor of claim 5,
   the plurality of horizontal phase-detection rows comprising at least ten phase-detection rows; and
   the plurality of vertical phase-detection columns comprising at least ten phase-detection columns.

7. An image sensor for on-chip phase detection, comprising:
   a pixel array for capturing an image of a scene, the pixel array being composed of a plurality of color pixel groups for generating a color image of the scene, each of the color pixel groups having a plurality of types of color-sensitive pixels sensitive to a respective plurality of colors, the pixel array including:
      (a) a plurality of horizontal phase-detection rows, each including a first plurality of phase-detection pixels for detecting horizontal change in the scene, and
      (b) a plurality of vertical phase-detection columns, each including a second plurality of phase-detection pixels for detecting vertical change in the scene,
      each of the plurality of vertical phase-detection columns intersecting each of the plurality of horizontal phase-detection rows, all of the first and second phase-detection pixels being of same one of the plurality of types;
   the plurality of color pixel groups including:
      a plurality of non-phase-detection color pixel groups including no phase-detection pixels, and
      a plurality of phase-detection color pixel groups, each including at most one of the phase-detection pixels and being adjacent to at most two other ones of the phase-detection color pixel groups.

8. A phase-detection method using an image sensor with on-chip phase-detection pixels, the method comprising:
   generating a pair of horizontal line profiles for light from left and right directions, respectively, using one of a plurality of horizontal phase-detection rows of the image sensor, the pair of horizontal line profiles comprising (a) a line profile produced by a plurality of left-masked pixels arranged in a first horizontal pixel row and (b) a line profile produced by a plurality of right-masked pixels arranged in a second horizontal pixel row;
   generating a pair of vertical line profiles for light from up and down directions, respectively, using one of a plurality of vertical phase-detection columns of the image sensor, the one of a plurality of vertical phase-detection columns intersecting the one of a plurality of horizontal phase-detection rows, the pair of vertical line profiles comprising (a) a line profile produced by a plurality of top-masked pixels arranged in a first vertical pixel column and (b) a line profile produced by a plurality of bottom-masked pixels arranged in a second vertical pixel column; and
   determining phase shift associated with at least one arbitrarily oriented edge in a scene viewed by the image sensor, based upon the pair of horizontal line profiles and the pair of vertical line profiles.

9. The method of claim 8, further comprising:
   adjusting focus of an imaging objective to reduce the phase shift.

10. The method of claim 9, further comprising:
    capturing an image of the scene using the image sensor.

11. The method of claim 10,
    the step of generating a pair of horizontal line profiles comprising using a first portion of a plurality of phase-detection pixels associated with the plurality of horizontal phase-detection rows;
    the step of generating a pair of vertical line profiles comprising using a second portion of a plurality of phase-detection pixels associated with the plurality of vertical phase-detection columns; and
    the method further comprising correcting contribution to the image, from each of the phase-detection pixels associated with the plurality of horizontal phase-detection rows and each of the phase-detection pixels associated with the plurality of vertical phase-detection columns, based upon respectively adjacent non-phase-detection pixels of corresponding color-sensitivity.

12. The method of claim 8, the step of determining phase shift comprising:
- identifying feature, associated with the arbitrarily oriented edge, in at least one of (a) the pair of horizontal line profiles and (b) the pair of vertical line profiles;
- evaluating, for at least one of (a) the pair of horizontal line profiles and (b) the pair of vertical line profiles, phase shift of the feature; and
- defining the phase shift of the arbitrarily oriented edge as the value of the phase shift of the feature.

13. A phase-detection method using an image sensor with on-chip phase-detection pixels arranged in a plurality of horizontal phase-detection rows and a plurality of vertical phase-detection columns, the method comprising:
- selecting a region of interest having arbitrary location and being associated with the arbitrarily oriented edge, the region of interest having extent sufficient to include (a) at least one portion of at least one of the plurality of horizontal phase-detection rows and (b) at least one portion of at least one of the plurality vertical columns of phase-detection pixels;
- generating a pair of horizontal line profiles for light from left and right directions, respectively, for each of the at least one portion of each of the at least one of the plurality of horizontal phase-detection rows;
- generating a pair of vertical line profiles for light from up and down directions, respectively, for each of the at least one portion of each of the at least one of the plurality of vertical phase-detection columns; and
- determining phase shift associated with at least one arbitrarily oriented edge in a scene viewed by the image sensor, based upon one or more pairs of line profiles measured in the step of generating a pair of horizontal line profiles and the step of generating a pair of vertical line profiles.

14. An imaging system with on-chip phase-detection, comprising:
- an image sensor including a pixel array for capturing an image of a scene, the pixel array having intersecting (a) horizontal phase-detection rows for measuring at least one pair of horizontal line profiles for light incident from left and right directions, respectively, and (b) vertical phase-detection columns for measuring at least one pair of vertical line profiles for light incident from up and down directions, respectively;
- a phase-processing module for processing the at least one pair of horizontal line profiles and the at least one pair of vertical line profiles to measure phase shift associated with an arbitrarily oriented and arbitrarily located edge in the scene; and
- a region-of-interest selection module for selecting at least one of the horizontal phase-detection rows and at least one of the vertical phase-detection columns for processing by the phase-processing module to measure the phase shift.

15. The imaging system of claim 14, further comprising an autofocus module for adjusting focus of an imaging objective to reduce the phase shift.

16. The imaging system of claim 14,
- each of the horizontal phase-detection rows including a first plurality of partially masked pixels, each of the first plurality of partially masked pixels detecting light from one of the left and right directions;
- each of the vertical phase-detection columns including a second plurality of partially masked pixels, each of the second plurality of partially masked pixels detecting light from one of the up and down directions; and
- the imaging system further comprising an image correction module for correcting contribution to the image from each of the partially masked phase-detection pixels based upon adjacent non-phase-detection pixels of the pixel array.

* * * * *